(12) United States Patent
Lauer et al.

(10) Patent No.: US 11,510,534 B2
(45) Date of Patent: Nov. 29, 2022

(54) DOCKING STATION

(71) Applicant: Black & Decker Inc., New Britain, CT (US)

(72) Inventors: Arthur Lauer, Frankfurt (DE); Marcus Rompel, Runkel (DE); Richard Cacchiotti, Middle River, MD (US)

(73) Assignee: Black & Decker Inc., New Britain, CT (US)

( * ) Notice: Subject to any disclaimer, the term of this patent is extended or adjusted under 35 U.S.C. 154(b) by 989 days.

(21) Appl. No.: 16/249,086

(22) Filed: Jan. 16, 2019

(65) Prior Publication Data

US 2019/0223669 A1     Jul. 25, 2019

(30) Foreign Application Priority Data

Jan. 19, 2018  (GB) ..................................... 1800849
Apr. 20, 2018  (GB) ..................................... 1806482

(51) Int. Cl.
*A47L 7/00* (2006.01)
*B08B 9/08* (2006.01)
(Continued)

(52) U.S. Cl.
CPC ........ *A47L 7/0095* (2013.01); *B01D 46/0005* (2013.01); *B01D 46/4272* (2013.01);
(Continued)

(58) Field of Classification Search
CPC .............. A47L 7/0095; B01D 46/0005; B01D 46/4272; B01D 46/521; B01D 46/70;
(Continued)

(56) References Cited

U.S. PATENT DOCUMENTS 6,851,898 B2    2/2005  Ege et al.
2016/0114499 A1  4/2016  Woloszczuk

FOREIGN PATENT DOCUMENTS

EP    1157788        11/2001
EP    1679156 B1     4/2008
(Continued)

OTHER PUBLICATIONS

EP Communication Article 94(3) EPC dated Oct. 14, 2021, in co-pending EP application 19151629.
(Continued)

*Primary Examiner* — David Redding
(74) *Attorney, Agent, or Firm* — Amir R. Rohani

(57) ABSTRACT

A docking station for a dust collection box comprising: a housing; a socket formed by the housing configured to receive a dust collection box of a dust extractor; first and second apertures formed through a wall of the housing which aligns with air outlet and inlet apertures of a dust collection box when the dust collection box is mounted within the socket; a connector connectable to a vacuum source; and a dust channel mounted inside of the housing, which provides a passageway between the second aperture and the connector. The docking station may further include an air vent formed through a wall of the housing to allow air surrounding the housing to enter a cavity formed inside of the housing, where the first aperture is connected to the cavity in the housing to allow air in the cavity to exit the housing through the first aperture.

24 Claims, 18 Drawing Sheets

(51) Int. Cl.
  *B01D 46/00* (2022.01)
  *B25D 17/22* (2006.01)
  *B23Q 11/00* (2006.01)
  *B25F 5/02* (2006.01)
  *B01D 46/70* (2022.01)
  *B01D 46/52* (2006.01)
  *B01D 46/42* (2006.01)
  *B08B 5/04* (2006.01)
  B25D 16/00 (2006.01)
  B25D 17/24 (2006.01)

(52) U.S. Cl.
  CPC ........... *B01D 46/521* (2013.01); *B01D 46/70* (2022.01); *B08B 5/04* (2013.01); *B08B 9/08* (2013.01); *B23Q 11/0046* (2013.01); *B25D 17/22* (2013.01); *B25F 5/02* (2013.01); B25D 16/006 (2013.01); B25D 17/24 (2013.01); B25D 2216/0084 (2013.01); B25D 2217/0065 (2013.01); B25D 2217/0073 (2013.01); B25D 2250/265 (2013.01)

(58) Field of Classification Search
  CPC ......... B08B 5/04; B08B 9/08; B23Q 11/0046; B25D 17/22; B25D 16/006; B25D 17/24; B25D 2216/0084; B25D 2217/0065; B25D 2217/0073; B25D 2250/265; B25F 5/02
  See application file for complete search history.

(56) References Cited

FOREIGN PATENT DOCUMENTS

| | | |
|---|---|---|
| EP | 1872900 B1 | 7/2012 |
| EP | 2366490 B1 | 10/2012 |
| EP | 2599585 B1 | 6/2014 |
| EP | 3009058 A1 | 4/2016 |
| EP | 3135429 B1 | 11/2018 |

OTHER PUBLICATIONS

EP ESSR dated, Jul. 25, 2019, in co-pending EP application 19151629.

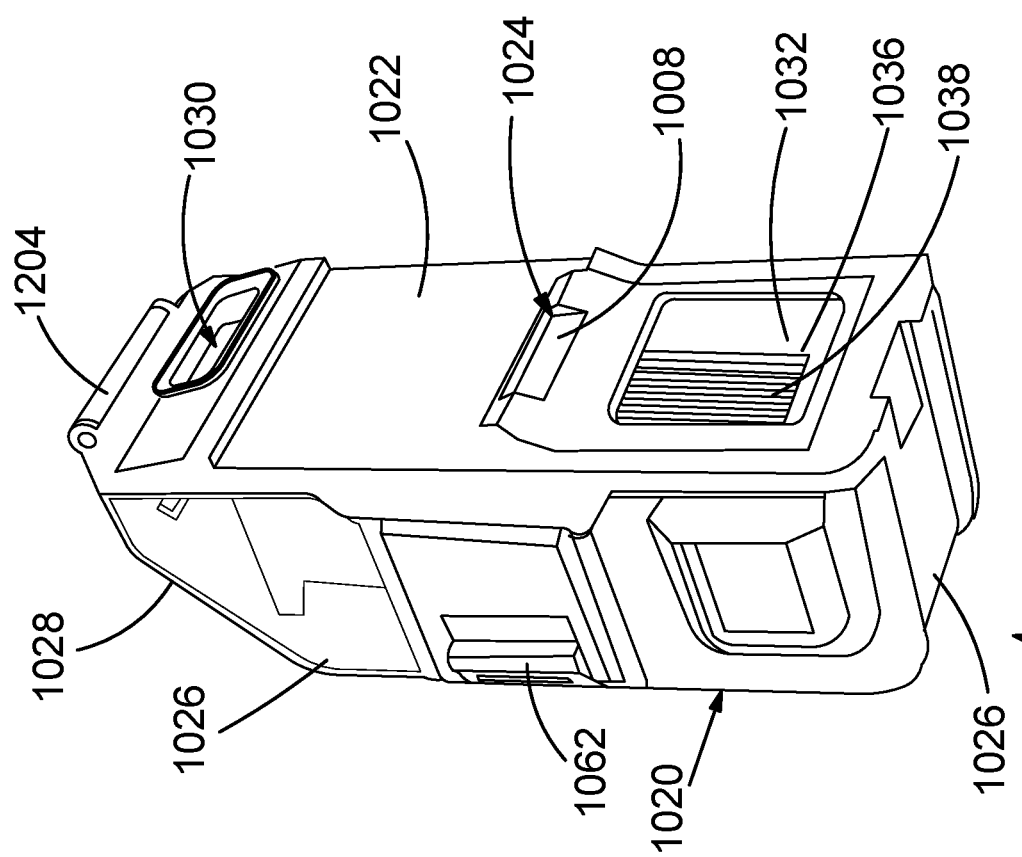
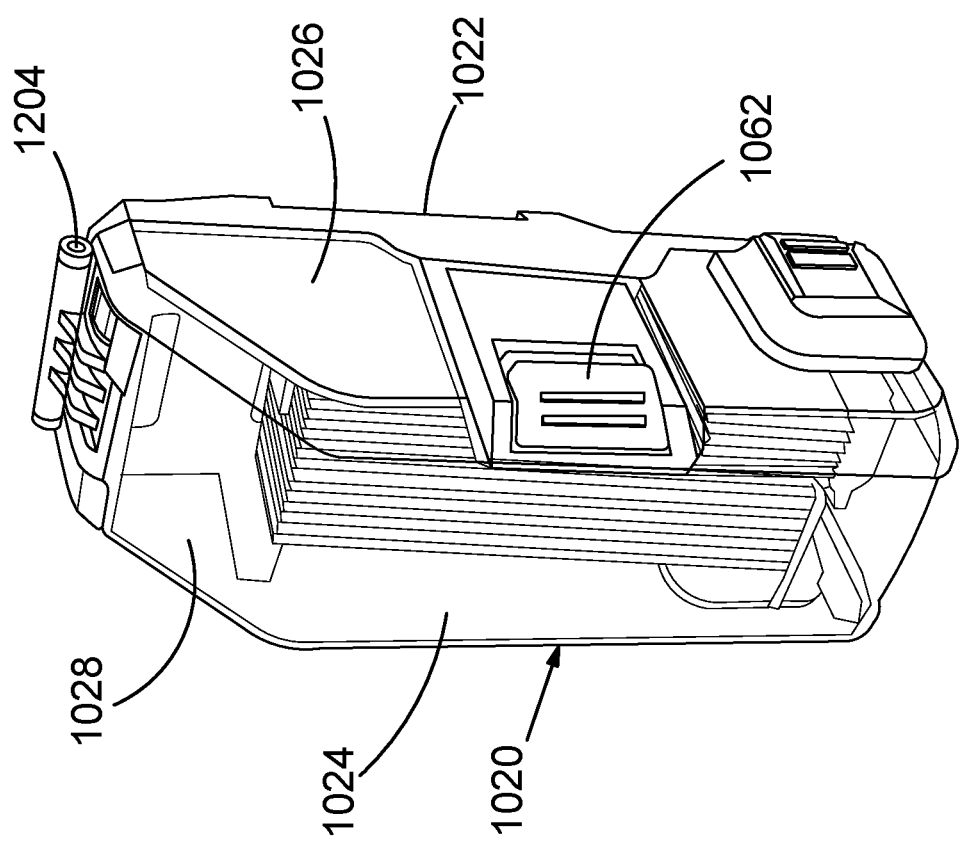
FIG. 4B
FIG. 4A

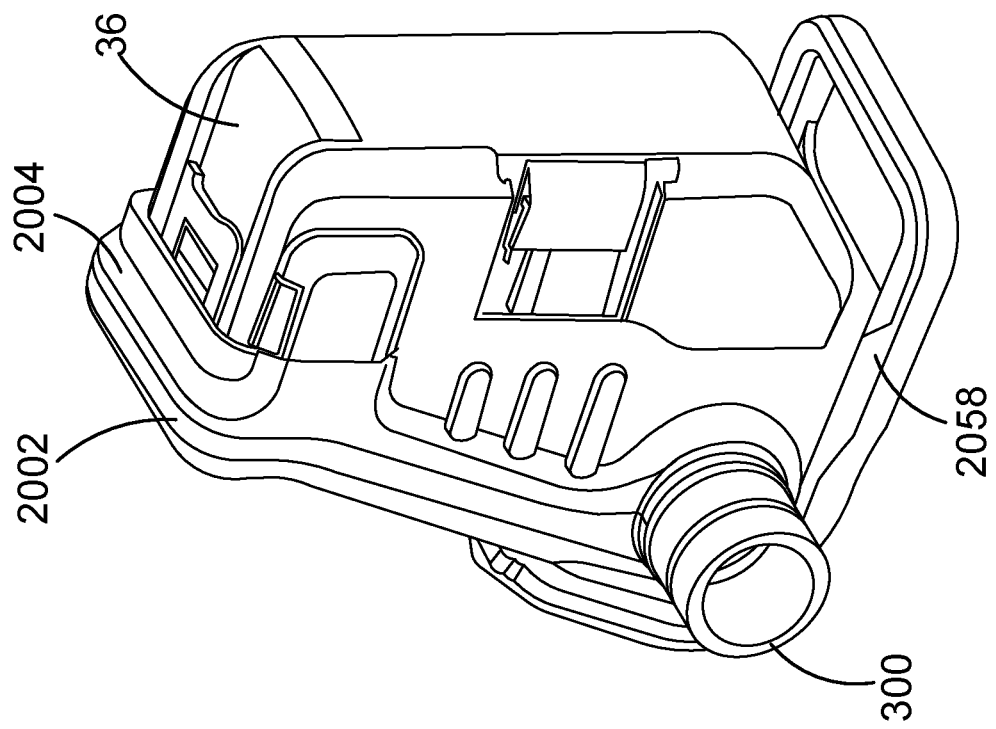
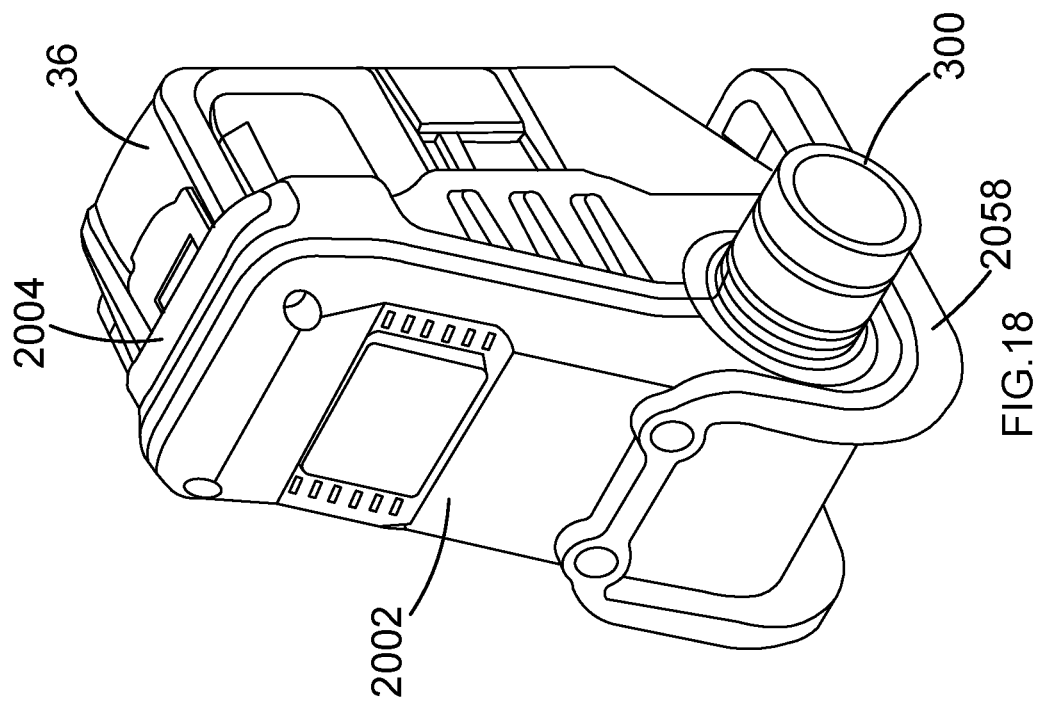

DOCKING STATION

CROSS-REFERENCE TO RELATED APPLICATIONS

This application claims priority, under 35 U.S.C. § 119, to UK Patent Application No. 18 008 49.0, filed Jan. 19, 2018, and UK Patent Applicant No. 18 064 82.4, filed Apr. 20, 2018.

FIELD

The present invention relates to a docking station for a dust collection box of a dust extractor.

BACKGROUND

One type of power tool drill is a hammer drill which typically comprises an electric motor, a hammer mechanism and/or a rotary drive. The hammer drill is powered ether by an AC mains electric power supply or a battery attached to the hammer drill. A cutting tool, such as a drill bit, is supported within a tool holder mounted on the front of the hammer drill which is driven by the motor via either the rotary drive or the hammer mechanism or both to perform cutting operations. Such a hammer drill usually can operate in a hammer only mode, a drill only mode or a hammer and drill mode.

EP1157788 describes a typical example of hammer drill

During the operation of a hammer drill, a large amount of dust can be generated. In addition to making the local vicinity dirty and clogging up the hammer drill, it can also be a health hazard to the operator of the hammer drill as the operator may breathe in the dust. As such it is desirable to collect the dust so that it can be safely disposed of.

One method of achieving this is to use a dust extractor which mounts onto the hammer drill. EP1245330 shows an example of a dust extractor.

Dust extractors are attached to the body of a hammer drill. The dust extractor comprises a main body and a shroud, typically mounted on the end of a tubular telescopic arm which is attached to the main body, and which surrounds the cutting tool and engages with the work piece being cut. The dust extractor comprises a dust collection box, a filter mounted within the dust collection box and an air suction device. Whilst the hammer drill is in use, the air suction device is switched on. During use, the dust generated by the cutting tool cutting the work piece enters the shroud. The air suction device draws the air together with dust from within shroud, through the telescopic arm into the dust collection box. The air passes then through the filter, whilst the dust is trapped by the filter within the dust collection box. The clean air is then typically expelled from the dust extractor. Once the operation of the hammer is complete, the dust extraction box can be removed from the dust extractor and the dust removed from the dust collection box and safely disposed of.

One problem with existing exiting designs of dust extractors is that the filter becomes blocked. As such, the filter needs to be cleaned which is typically done manually. Therefore, access to the filter has to be provided or the filter has to be made to be removable so that it can be manually cleaned. However, it is desirable if the cleaning process could be undertaken without the need to access the filter or remove it from the dust collection box. A backflush system could be used. However, an example known to proprietor of such a system is only capable of cleaning part of the filter.

SUMMARY

According to an embodiment, a docking station for a dust collection box is provided comprising: a housing; a socket formed by the housing configured to receive a dust collection box of a dust extractor; first and second apertures formed through a wall of the housing which aligns with air outlet and inlet apertures of a dust collection box when the dust collection box is mounted within the socket; a connector connectable to a vacuum source; and a dust channel mounted inside of the housing, which provides a passageway between the second aperture and the connector. In an embodiment, the docking station further includes an air vent formed through a wall of the housing to allow air surrounding the housing to enter a cavity formed inside of the housing, where the first aperture is connected to the cavity in the housing to allow air in the cavity to exit the housing through the first aperture.

BRIEF DESCRIPTION OF THE DRAWINGS

Two embodiments of the present invention will now be described with reference to the accompanying drawings of which:

FIG. 4A shows a front perspective view of the dust collection box 36 according to FIG. 2;

FIG. 4B shows a rear perspective view of the dust collection box 36 according to FIG. 2;

FIG. 18 shows a front perspective view of the docking station according to a second embodiment of the present invention with a dust collection box mounted within the socket of the docking station;

FIG. 19 shows a rear perspective view of the docking shown in FIG. 18 with a dust collection box mounted within the socket of the docking station;

DETAILED DESCRIPTION

A known design of dust extractor will now be described with reference to FIG. 1.

Figure 1:
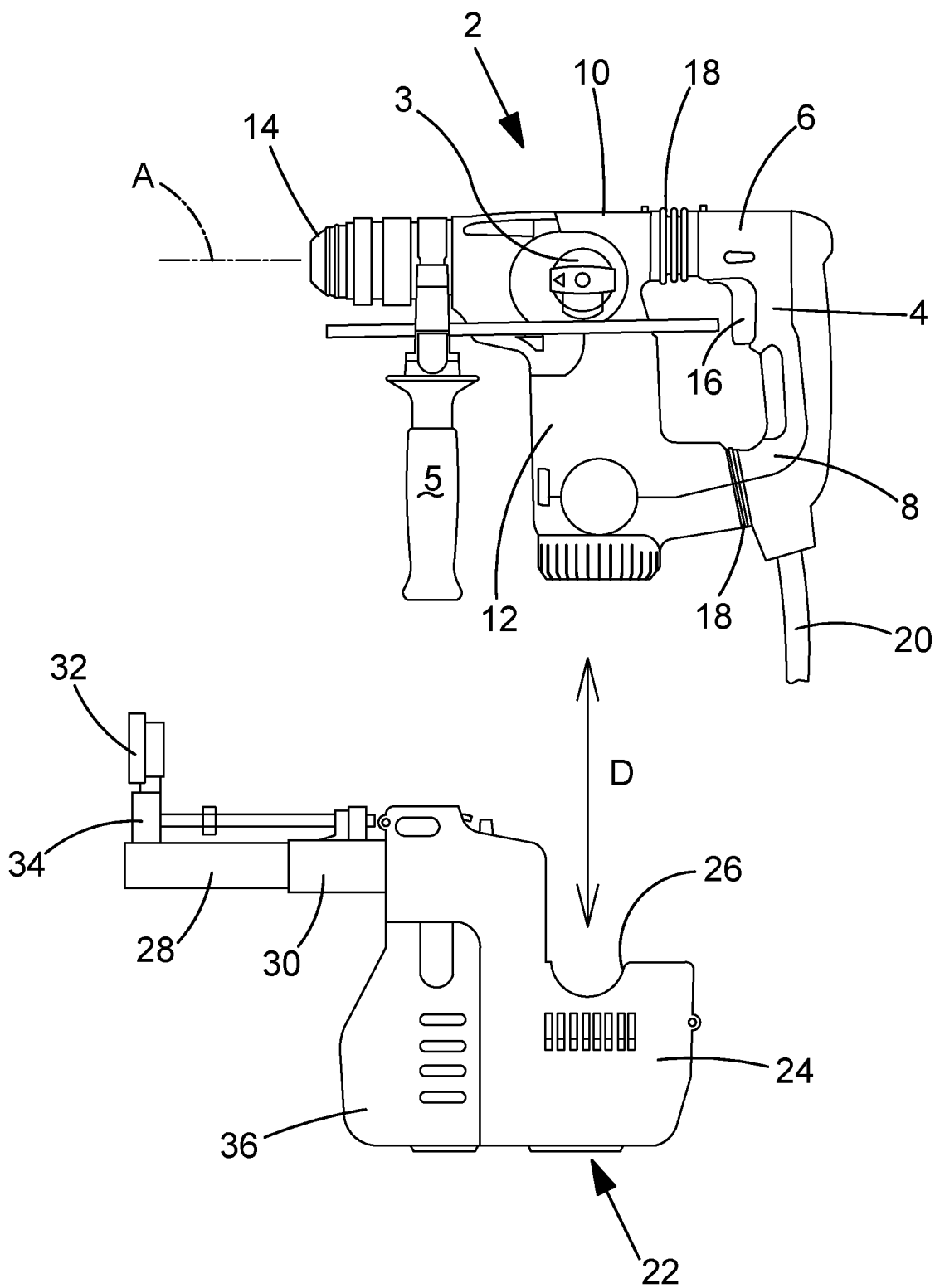
FIG. 1 shows a side view of a known design of hammer drill and known design of dust extractor.

Referring to FIG. 1, a hammer drill comprises a main housing 2 and a rear handle 4 attached to the main housing 2 via vibration dampeners 18 at its upper 6 and lower 8 ends. The main housing 2 comprises a motor housing 12, in which is mounted an electric motor (not shown), and a transmission housing 10, in which is mounted the hammer mechanism (not shown) and rotary drive (not shown). A mode change knob 3 is used to change the mode of operation of the hammer drill. A tool holder 14 is mounted on the front of the transmission housing 10 which is capably of releasably holding a cutting tool (not shown). The tool holder is cable of being rotated about axis A. A front handle 5 is attached to the transmission housing 10 behind the tool holder 14. A trigger switch 16 is mounted within the rear handle 4 by which an operator can activate the hammer drill. An electric cable 20 connects to the base of the rear handle 4 by which a mains AC electric power supply is supplied to the hammer drill.

A typical dust extractor comprises a main housing 22 manufactured from two plastic clam shells 24, 26 which are joined together about a vertical plane using screws. Mounted on the top of the main housing 22 is a telescopic tubular extension arm 28, 30. A first section 28 of the telescopic arm 30 can slide in and out of the other second section 30. A spring (not shown) biases the first section 28 out of the second section 30 towards its maximum extended position.

Mounted on the end of the first section 28 remote from the main housing is a tubular support 34 and a shroud 32. A hole is formed through the shroud 32 to allow a cutting tool to pass through the shroud 32.

A dust collection box 36 releaseably connects to the front of the main housing 22. A filter 102 is mounted inside of the dust collection box 36 which connects to the main housing 22 when the dust collection box 36 is connected to the main housing 22.

When attaching the dust extractor to the hammer drill, the dust extractor is slid in the direction of Arrow D onto the motor housing 12 until a latch (not shown) reliably attaches the dust extractor to the motor housing 12. When the dust extractor is mounted on the hammer drill, an electrical connection is made between the dust extractor and the hammer drill so that electrical power and signals can be transmitted from the hammer drill to the dust extractor.

An example of a dust extractor of dust collection box will now be described with reference to FIGS. 2 to 7. Whilst this example is known to the proprietor, its details do not form prior art. Where the same features are present in the example are present in the dust extractor described with reference to FIG. 1, the same reference numbers have been used.

Referring to the FIGS. 2 to 7, the dust collection box 36 comprises a substantially rectangular plastic container 1020 having a base 1024, side walls 1026 and an angled wall 1028 which connects between the base 1024 and three of the side walls 1026. The edges of the side walls 1026 form a large aperture through which an internal cavity formed by the base 1024, side walls 1026 and an angled wall 1028 can be accessed. The large cavity can be sealed by a lid 1022 which is pivotally mounted at a pivot joint 1204 on the edge of one of the side walls 1026. The lid 1022 can pivot between an open position where the cavity can be accessed and a closed position where the large aperture is sealed.

The lid 1022 comprises three apertures, an air inlet aperture 1030, an air outlet aperture 1032 and an ambient air aperture 1034 through which air can pass when the aperture is open.

Mounted on the lid 1022 is a filter 102. The filter 102 comprises pleated filter paper 1038 which is surrounded by a rectangular rubber seal 1036. The rubber seal 1036 is mounted on a rectangular frame 1040 so that no air can pass between the frame 1040 and the seal 1036. The frame 1040 is mounted on the lid 1022 via side walls 1042 which extend the whole way around the frame 1040 between the frame 1040 and the lid 1022. An internal space 1044, 1046 is formed by filter 102, the frame 1040, the side walls 1042 and the lid 1022. The air outlet aperture 1032 and the ambient air aperture 1034 in the lid are surrounded by the frame 1040 and side walls 1042, the air outlet aperture 1032 and the ambient air aperture 1034 in the lid engaging with the internal space. Air is only capable of entering or exiting the internal space 1044, 1046 via the air out let aperture 1032, the ambient air aperture 1034 or through the pleated filter paper 1038.

Mounted on the lid 1022 in the internal space 1044, 1046, adjacent to and covering the ambient air aperture 1034, is an air valve 1048. The valve 1048 comprises a valve housing 1050 in which is formed a tubular passageway in which is mounted a rotatable air guide 1000. The ends of the valve housing are mounted on the side walls 1042 and engage with the frame 1040 and seal 1036 of the filter 102. Air is unable to move around the ends of the valve housing 1050 between the ends of the valve housing 1050 and the side walls 1042, the frame 1040 or the seal 1036. The sides of the valve housing 1050 locate between and abut against both the lid 1022 and the filter 102 in the internal space 1044, 1046, forming a barrier across the width of the internal space 1044, 1046 and separating it into two chambers, an air outlet chamber 1044 and an air intermediate chamber 1046. Air is unable to move around the side of the valve housing 1050 either between the outer surface of the side of the valve housing 1050 and the lid 1022 or between the outer surface of the side of the valve housing 1050 and the filter 102. As such, air can only pass between the intermediate chamber 1046 and the air outlet chamber 1044 by passing through the valve 1048. The air outlet aperture 1032 is formed in the lid 1022 so that it engages with the air outlet chamber 1044 of the internal space 1044, 1046.

The valve housing 1050 has three apertures, a first aligned with air outlet chamber 1044, a second aligned with the air intermediate chamber 1046 and a third aligned with the ambient air aperture 1034. Air is capable of entering or exiting the valve 1048 through any one of the three apertures.

The rotatable air guide 1000 comprises a first rod section 1002 of uniform circular cross section along its length and a second pin section 1004 of uniform circular cross section along its length. The longitudinal axis 1006 of the first rod section 1002 is co-axial with the longitudinal axis of the second pin section 1004. The rotatable air guide 1000 is rotatably mounted in the valve housing 1050 via the first rod section 1002 and the second pin section 1004. The rotatable air guide 1000 is capable of rotating within the valve housing 1050 around longitudinal axis 1006 of the first rod section 1002 and the second pin section 1004.

Attached to the inner end of the first rod section 1002 is a first circular disk 1010, the axis of the first disk 1010 being co-axial with the longitudinal axis 1006 of the first rod section 1002. Attached to the inner end of the second pin section 1004 is a second circular disk 1012, the axis of the second disk 1012 being co-axial with the longitudinal axis 1006 of the second pin section 1002. Interconnecting the first rod section 1002 via the first disk 1010 and the second pin section 1004 via the second disk 1012 is an intermediate section 1008 having a C shaped cross section along its length. The outer periphery of the intermediate section 1008 in cross section is circular, the periphery being curved around the longitudinal axis 1006 of the first rod section 1002 and the second pin section 1004. A third circular disk 1014 and a fourth circular disk 1016 are attached at their peripheries to the intermediate section 1008 along the length of the intermediate section 1008 equidistantly between the first and second disks 1010, 1012. The first, second, third and fourth disks, 1010, 1012, 1014, 1016 are parallel to each other, are co-axial with each other and the first rod section 1002, and have the same diameter as the periphery of the intermediate section 1008 in cross section. The spaces 1018 between the first, second, third and fourth disks, 1010, 1012, 1014, 1016 form passageways 1200 through which air can pass as described in more detail below.

Mounted on the outer end of the first rod section 1002, remote from the first disk 1010, is a cam 1052.

The rotatable air guide 1000 is made in a one-piece construction from plastic material.

The rotatable air guide 1000 is rotatably mounted within the tubular passage of the valve housing 1050 and is capable of rotating between two positions.

In the first position, the rotatable air guide 1000 is angularly positioned so that the passageways 1200 between the first, second, third and fourth disks, 1010, 1012, 1014, 1016 connect between the first aperture of the valve housing 1050 aligned with the air outlet chamber 1044 and the second aperture of the valve housing 1050 aligned with the air intermediate chamber 1046. In the first position, the intermediate section 1008 covers the third aperture of the valve housing 1050 to seal it. As such, when the rotatable air guide 1000 is in its first position, air can flow freely between the air outlet chamber 1044 and the air intermediate chamber 1046. No air is able to pass through the ambient air aperture 1034 as the third aperture of the valve housing 1050 is sealed by the intermediate section 1008 of the rotatable air guide 1000.

In the second position, the rotatable air guide is angularly positioned so that the passageways 1200 between the first, second, third and fourth disks, 1010, 1012, 1014, 1016 connect between the second aperture of the valve housing 1050 aligned with the air intermediate chamber 1046 and the third aperture of the valve housing 1050 aligned with the ambient air aperture 1034. In the second position, the intermediate section 1008 covers the first aperture of the valve housing 1050 to seal it. As such, when the rotatable air guide 1000 is in its second position, air can flow freely between the air intermediate chamber 1046 and the ambient air aperture 1034. No air is able to pass into or out off the air outlet chamber 1044 as the first aperture of the valve housing 1050 is sealed by the intermediate section 1008 of the rotatable air guide 1000.

Mounted in a slideable manner on a side wall 1026 of the rectangular plastic container 1020 is a slider 1060 which is capable of sliding between a first forward position and a second rearward position. The slider 1060 comprises a finger pad 1062 by which an operator can manually slide the slider 1060 between its first and second positions. The slider 1060 further comprises an elongate bar 1064 which extends rearwardly. When the slider 1060 slides between its first and second positions, the elongate bar 1064 slides in a direction substantially parallel to its longitudinal axis. A spring 1066 is sandwiched between slider 1060 and a surface formed on the side wall 1026 of the container 1020.

The spring 1066 is made from two plastic resilient strings 1068 which are each arranged in a wave like manner, the undulations of which extend in a plane parallel to the plane of the side wall of the container 1020 on which the slider 1060 is mounted. The peaks 1070 and troughs 1072 of the waveforms of the strings 1068 co-inside with the troughs 1072 of the strings 1068 being connected together to form diamond shaped apertures 1074 surrounded by the strings 1068 between each set of adjacent troughs 1072. The spring 1066 compresses and expands within the plane of the undulations of the strings 1068, the length and width of the diamond apertures 1074 expanding and contracting as it is does so. The spring 1066 is made as a once piece construction and is integrally formed with and connected to the slider 1060.

The spring 1066 is compressed between the slider 1060 and the surface and therefore is subject to a compressive force. The spring 1066 biases the slider 1060 towards its first forward position.

When the lid 1022 is pivoted to its closed position to seal the large aperture of the container 1020, the filter 102, the frame 1040, the side walls 1042 which connect between frame 1040 and the lid 1022, and the valve 1048 locate inside of the internal cavity of the container 1020. This results in the air outlet chamber 1044 and the air intermediate chamber 1046 being located inside of the cavity. The remainder of the space within the cavity which surrounds the filter 102, the frame 1040, the side walls 1042 which connect between the frame 1040 and the lid 1022, and the valve 1048 forms another chamber referred to as the air inlet chamber 1202. The air inlet aperture 1030 formed in the lid 1022 engages with the air inlet chamber 1202. Air can only pass between the air inlet chamber 1202 and both of the air outlet chamber 1044 and the air intermittent chamber 1046 of the internal space by passing through the filter 102.

Furthermore, when the lid 1022 is pivoted to its closed position to seal the large aperture of the container, the end of the elongate bar 1064 locates in close proximity to and engages with the cam 1052 of the rotatable air guide 1000. When the slider 1060 is in its forward position, the cam 1052 is moved clockwise (see FIG. 6C) with the elongate bar 1064 to move the rotatable air guide 1000 to its first position. When the slider 1060 is slid rearwardly against the biasing force of the spring 1066 to its second position, the cam 1052 is moved anti-clockwise (see FIG. 7C) by the end of the elongate bar 1064 which in turn rotates the rotatable air guide 1000 to its second position. As such, movement of the slider 1060 between its first and second positions rotates the rotatable air guide 1000 between its first and second positions respectively. The rotatable air guide 1000 is urged towards its first position by air flow or other means (eg gravity) during the normal operation of the dust extractor.

An additional biasing mechanism (not shown) such as a spring can be mounted on the lid 1022 which biases the rotatable air guide 1000 toward its first position to aid the rotational movement of the rotatable air guide 1000. If such a biasing mechanism is used, the reliance on an air flow or other means to urge the movement of the rotatable air guide can be omitted. If the strength of the additional biasing mechanism is sufficient, the spring 1066 which biases the slider 1060 forward, may be omitted from the design.

The filter 102 is separated into two parts 1080, 1210 along a glued split line 1212, each part acting as a separate filter. This results in air being only able to pass through filter by passing through one part only. The split line aligns with the valve 1050. As such air can only pass through a top part 1080 of the filter 102 between the air inlet chamber 1202 and the air intermediate chamber 1046 and through a bottom part 1210 between the air inlet chamber 1202 and the air outlet chamber 1044. A person skilled in the art however, will appreciate that that though the use of a glued split line 1212 may be desirable for the improved operation of the invention, it is not a requirement for the invention to function.

Figure 2:
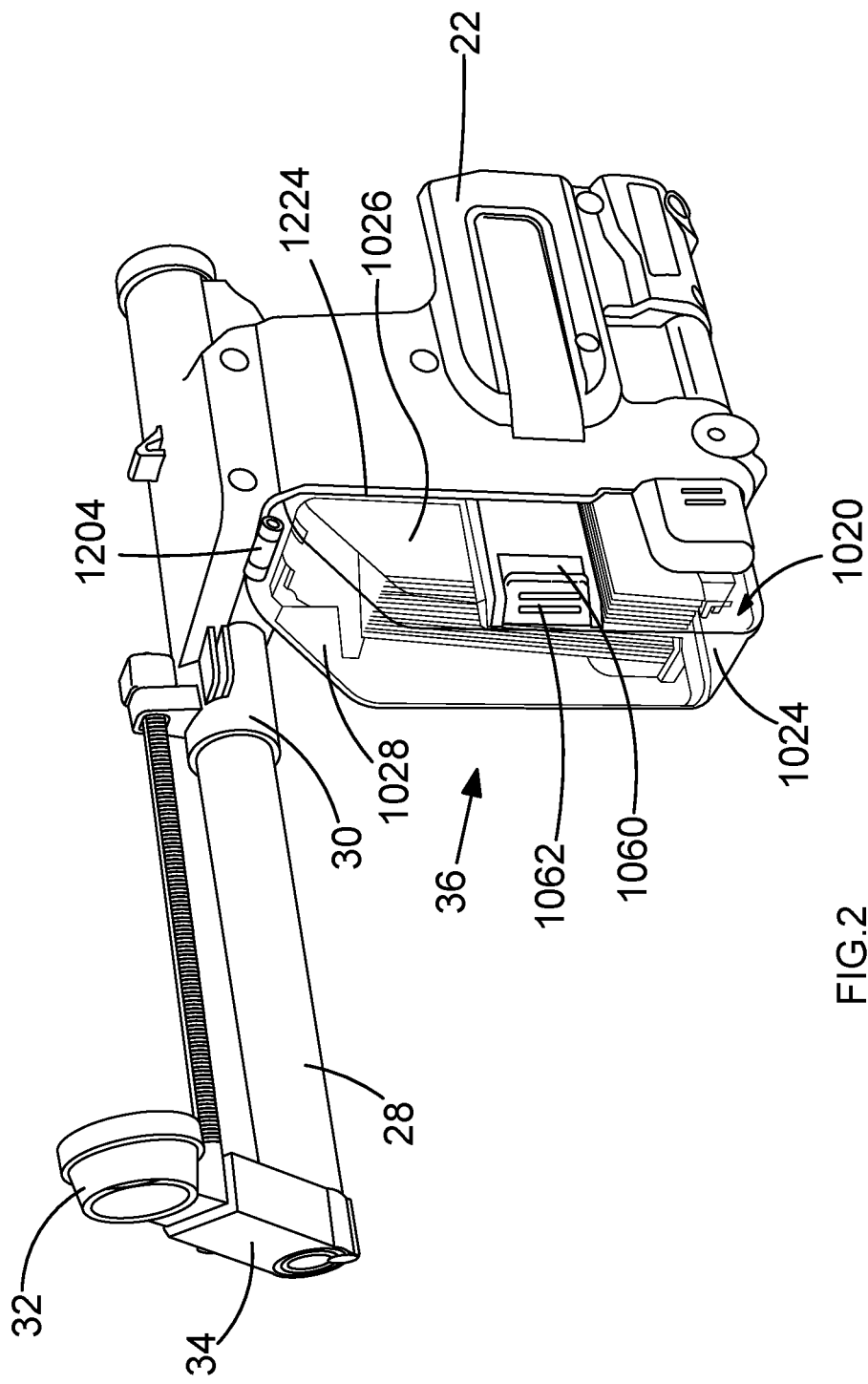
FIG. 2 shows a perspective view of an example of a dust extractor.
Figure 3:
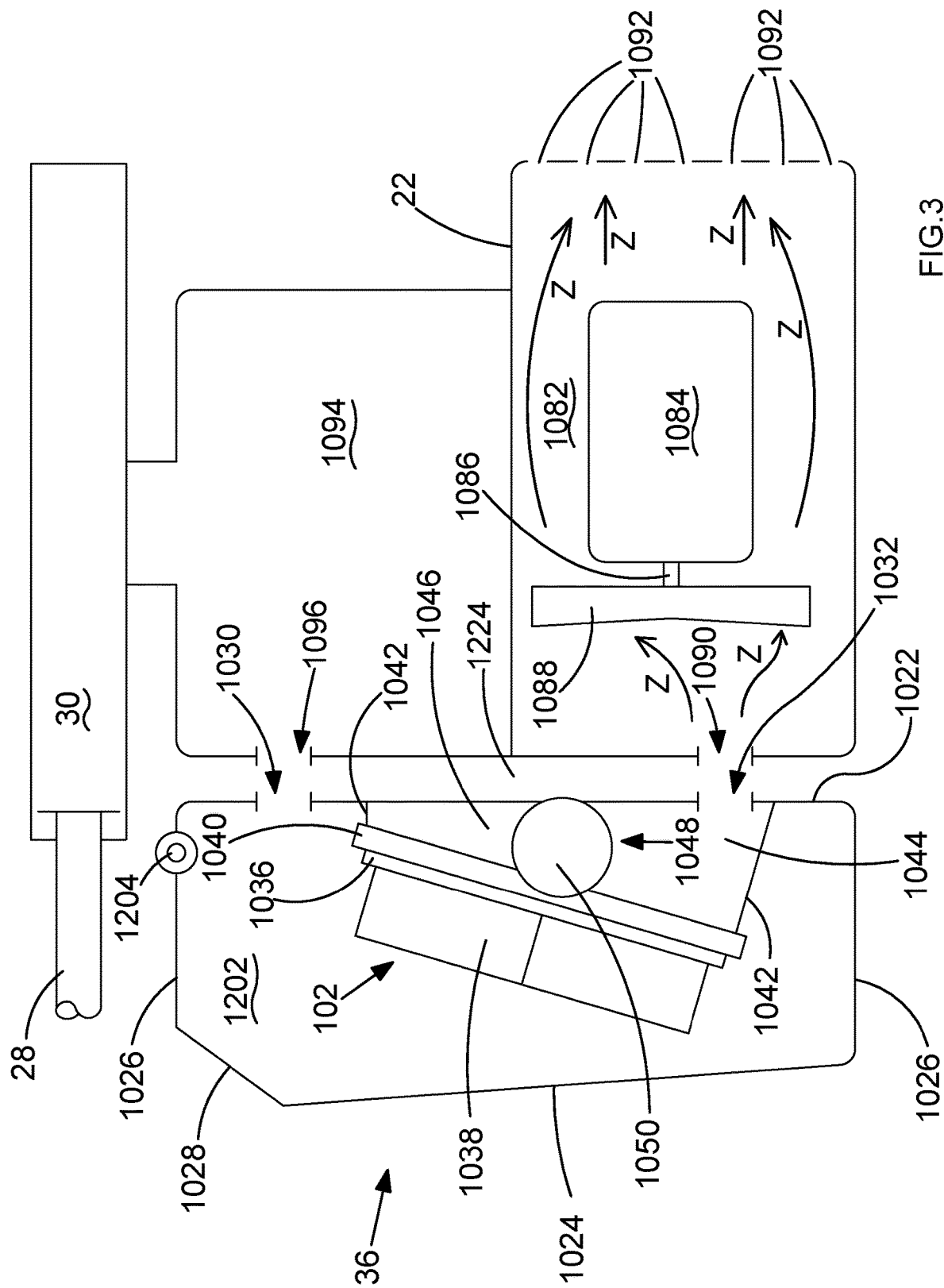
FIG. 3 shows a schematic diagram of a vertical cross section of the dust extractor of FIG. 2.
Figure 5:
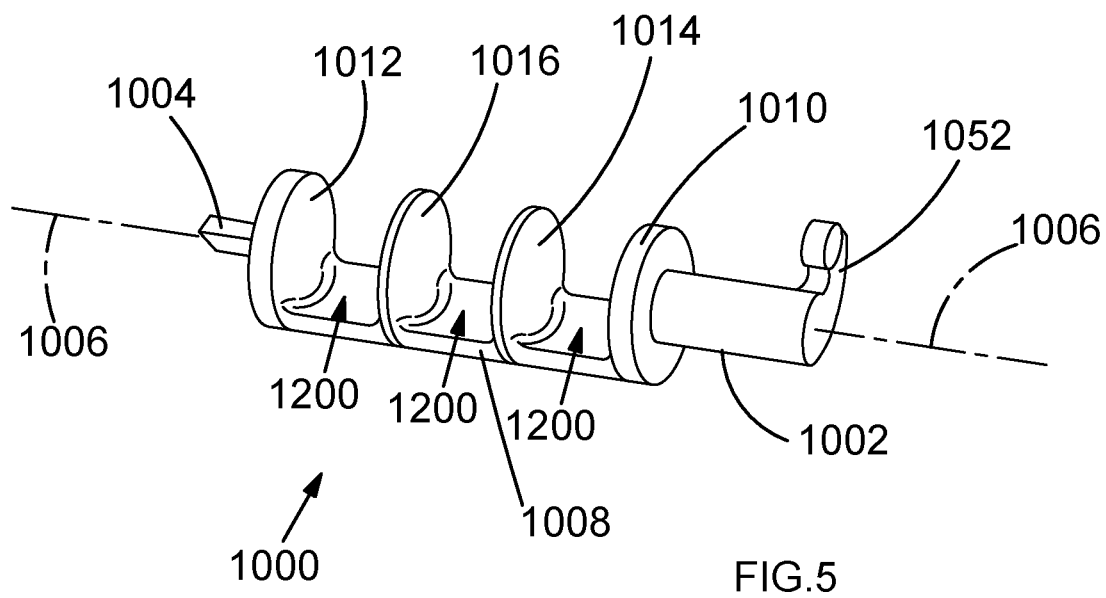
FIG. 5 shows the rotatable air guide of the valve.

As can be seen in FIG. 2, the main housing 22 of the dust extractor comprises a socket for receiving the dust collection box 36.

A motor chamber 1082 is formed inside of the main housing 22 in which is mounted an electric motor 1084. The electric motor 1082 is powered by an electrical power source provided by a hammer drill when the dust extractor is mounted on the hammer drill. Activation of the motor 1084 is controlled by a control circuit within the hammer drill which operates it in combination with the operation of the hammer drill. The motor 1084 comprises an output shaft 1086 on which is mounted an axial fan 1088. Formed in the wall of the main housing 22 in one end of the motor chamber 1082 is an air entry aperture 1090. Formed in the wall of the main housing in the opposite end of the motor chamber 1082 is a number of air holes 1092. When the motor 1082 is activated, the output shaft 1086 and fan 1088 rotate. As the fan 1088 rotates, it moves air in the direction of Arrows Z, drawing air through the air entry aperture 1090 into the motor chamber 1082, along the motor chamber 1082, the air passing over or through the motor 1082 as it does so, and blowing it out of the motor chamber 1082 through the air holes 1092 and into ambient air surround the dust extractor.

An air reception chamber 1094 is formed in the main housing 22 above the motor chamber 1082. The air reception chamber 1094 is in fluid connection with the passage inside of telescopic tubular arm 28, 30 so that air and debris can pass from the telescopic tubular arm into the air reception chamber 1094. Formed in the wall of the main housing 22 in the air reception chamber 1094 is an air exit aperture 1096 through which air can exit the air reception chamber 1094.

When the dust collection box 36 is attached to main housing 22 within the socket, the air outlet aperture 1032 of the dust collection box 36 aligns with the air entry aperture 1090 of the main housing 22. When the dust collection box 36 is attached to main housing 22 within the socket, the air inlet aperture 1030 of the dust collection box 36 aligns with the air exit aperture 1096 of the main housing 22.

When the dust collection box 36 is attached to main housing 22 within the socket, the ambient air aperture 1034 aligns with a gap 1224 formed between the dust collection box 36 and the main housing 222. The gap 1224 connects with ambient air surrounding the dust extractor. As such the air can pass between the valve 1048 and the ambient air via the ambient air aperture 1034 and the gap 1224.

During operation of the dust extractor, the dust collection box 36 is attached to the main housing of the dust extractor, and then the dust extractor is attached to a hammer drill in well-known manner.

Figure 6A:
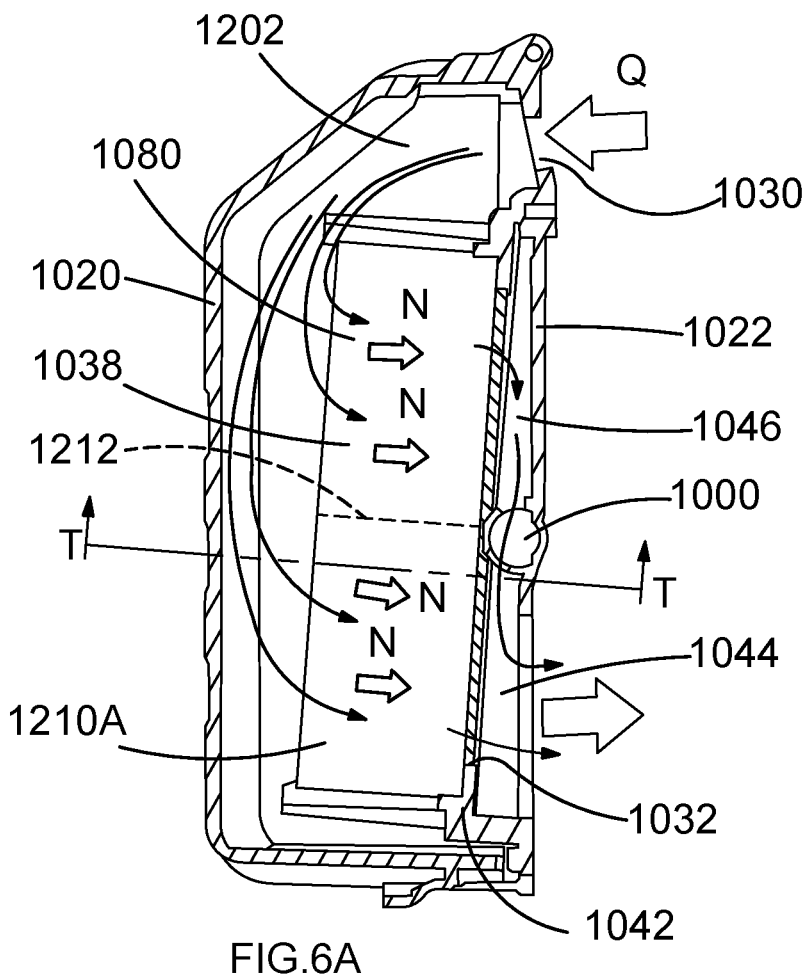
FIG. 6A shows a vertical cross section of the dust collection box 36 when the air is passing through it during the normal operation of the dust extractor.
Figure 6B:
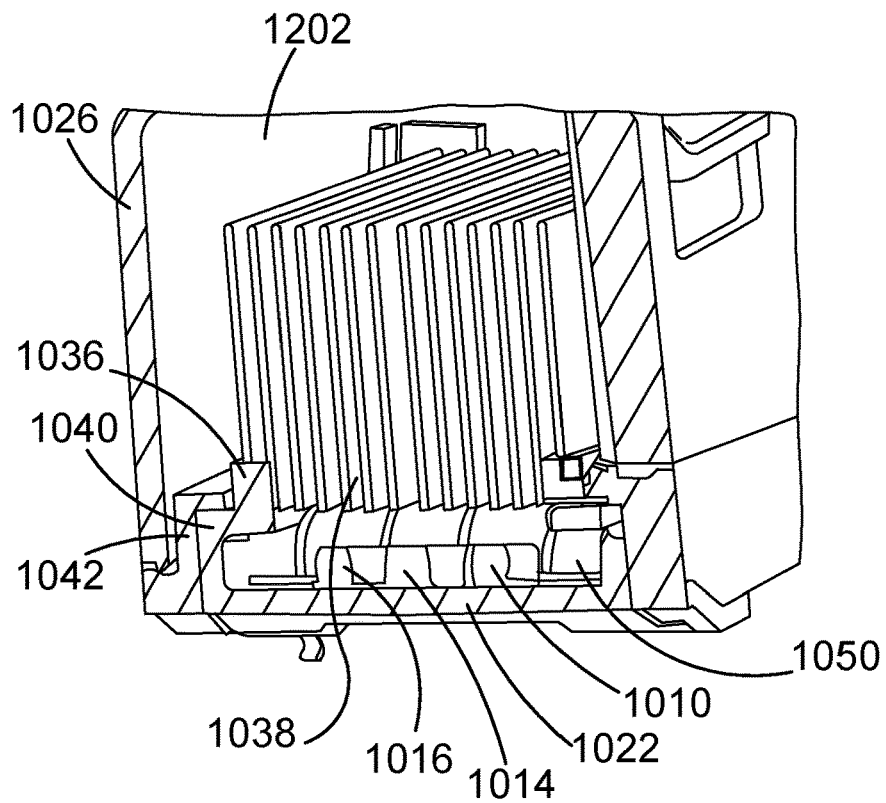
FIG. 6B shows a horizontal cross section of the dust collection box 36 in the direction of Arrows T in FIG. 6A.
Figure 6C:
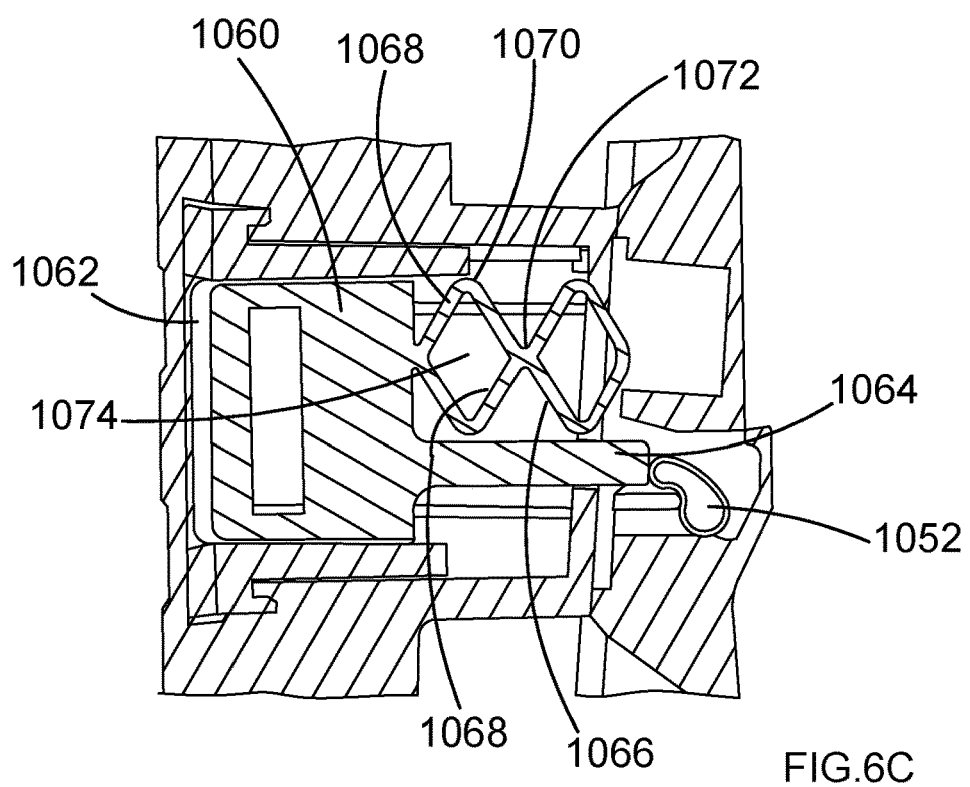
FIG. 6C shows a vertical cross section of the slider and spring when the air is passing through it during the normal operation of the dust extractor as shown in FIG. 6A.
Figure 7A:
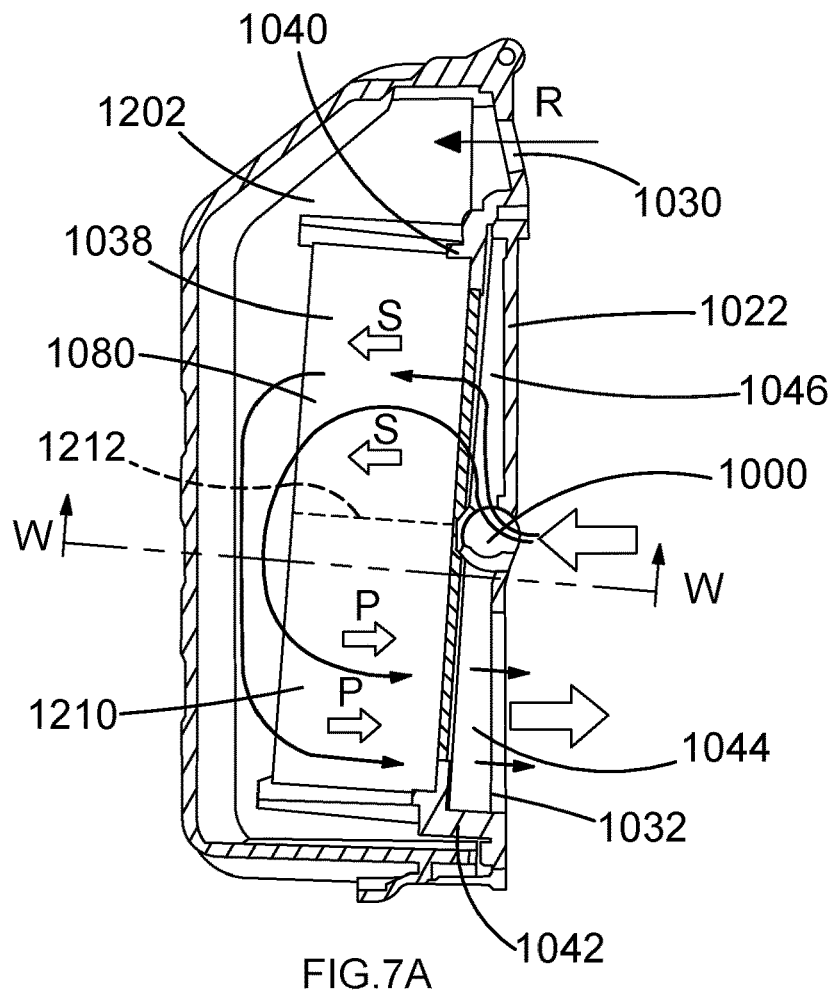
FIG. 7A shows a vertical cross section of the dust collection box 36 when the air is passing through it during the backflush operation of the dust extractor.
Figure 7B:
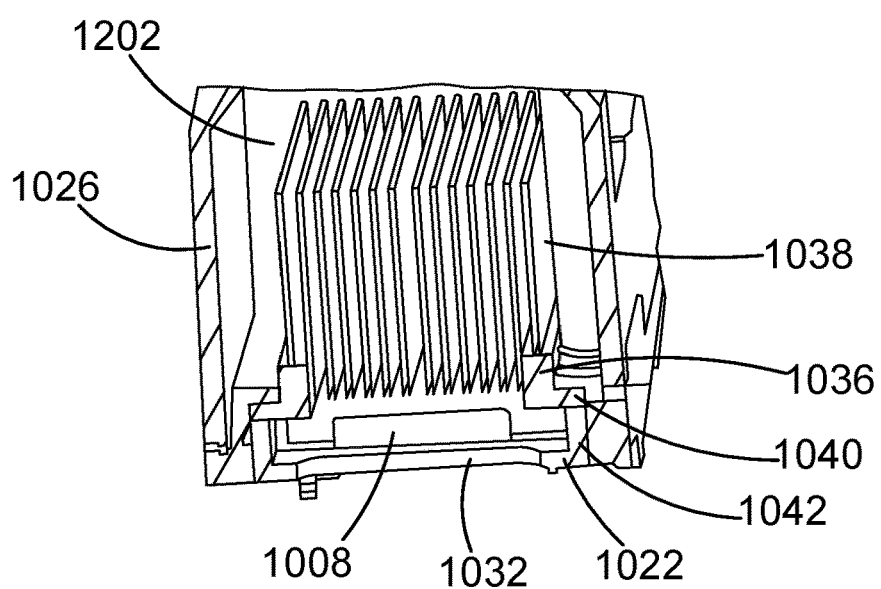
FIG. 7B shows a horizontal cross section of the dust collection box 36 in the direction of Arrows W in FIG. 7A.
Figure 7C:
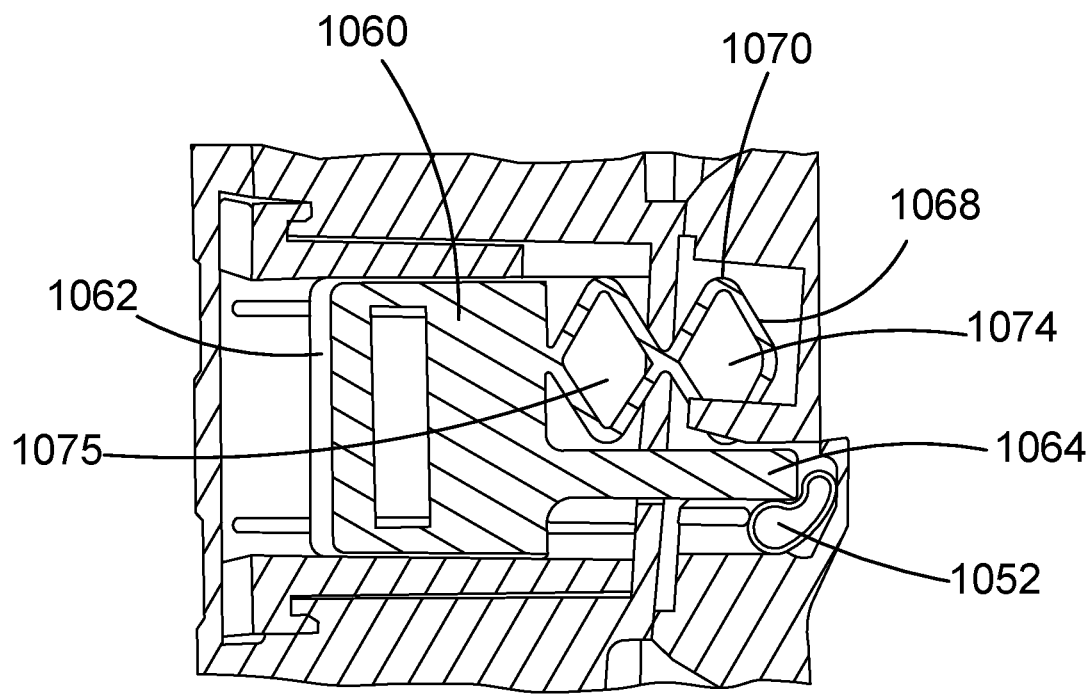
FIG. 7C shows a vertical cross section of the slider and spring when the air is passing through it during backflush as shown in FIG. 7A.
Figure 7D:
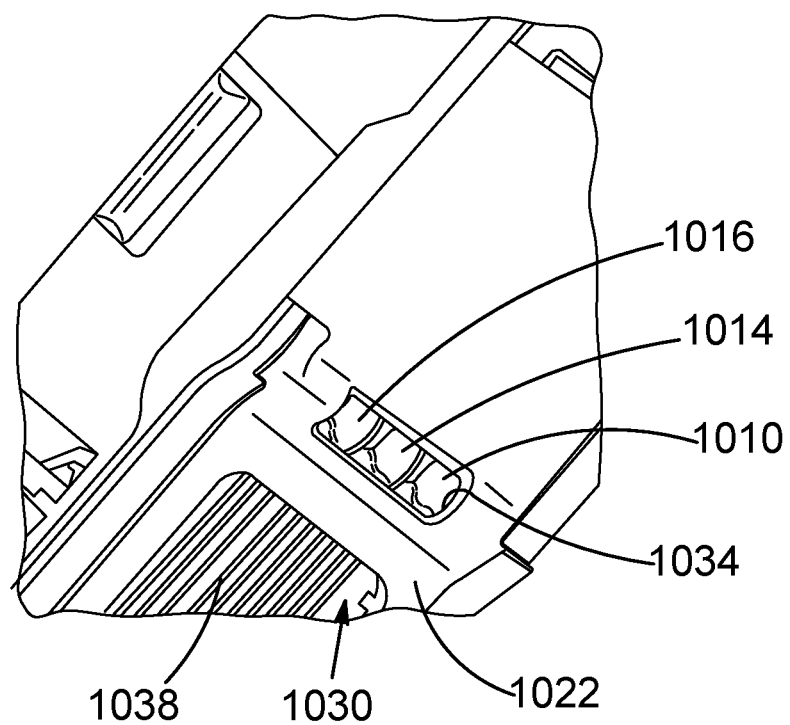
FIG. 7D shows a rear perspective view of the dust collection box 36 when the rotatable air guide is rotated to a position for backflush.
Figure 9:
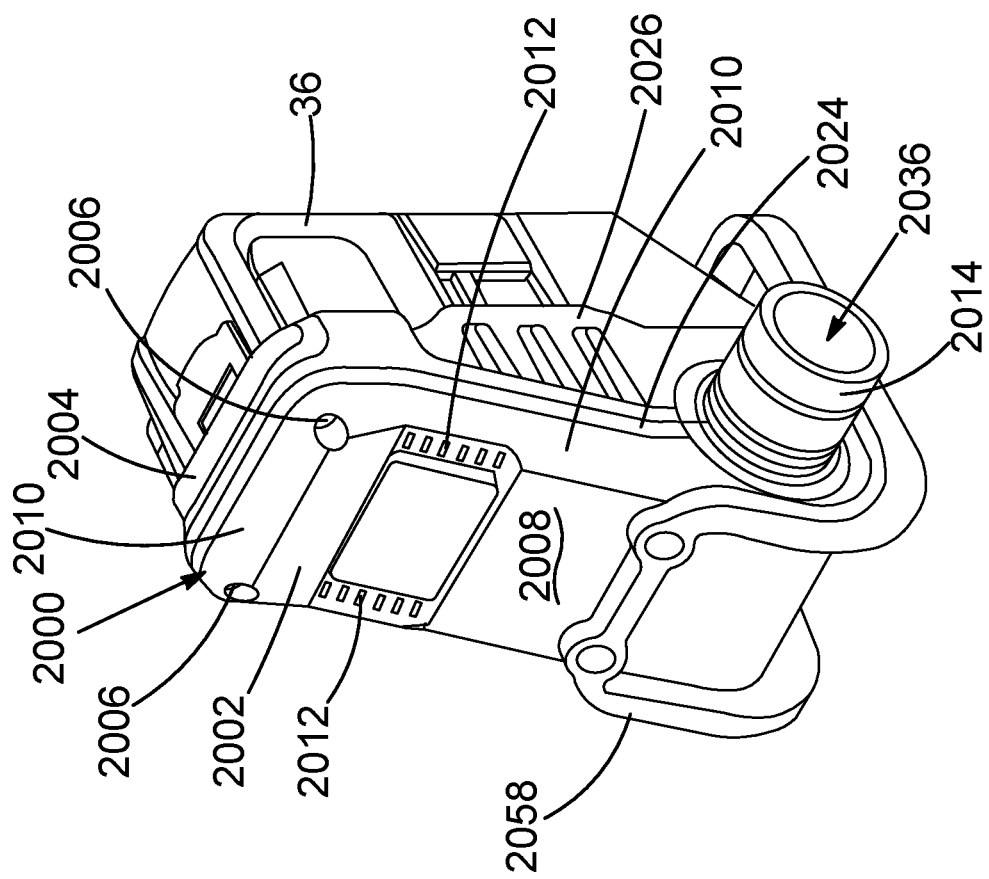
FIG. 9 shows a front perspective view of the docking shown in FIG. 8 with a dust collection box mounted within the socket of the docking station.
Figure 8:
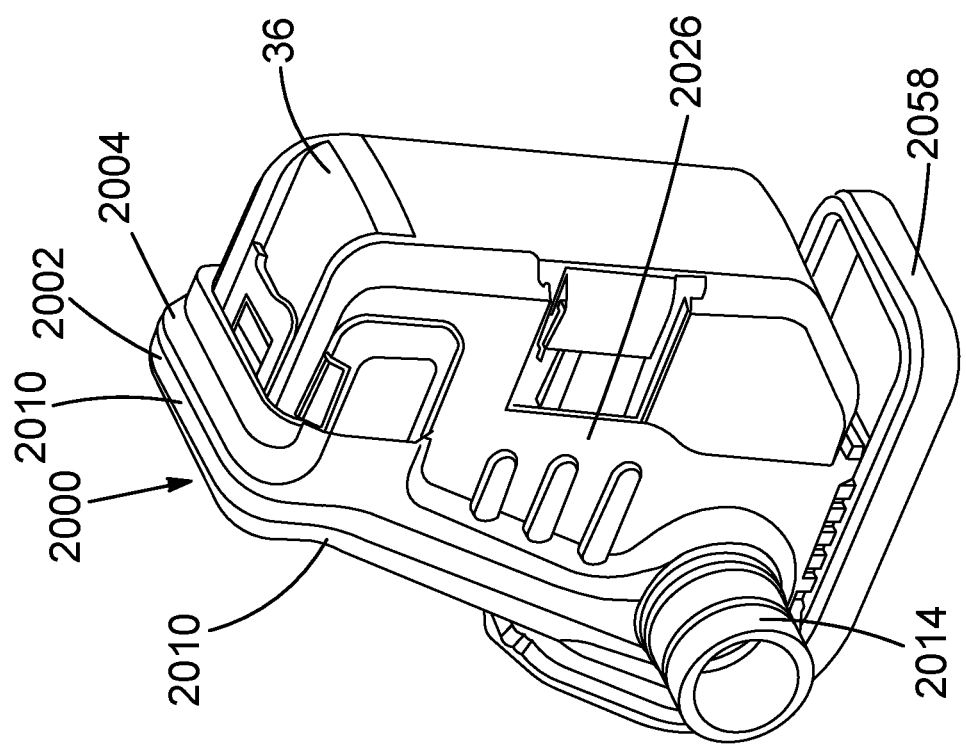
FIG. 8 shows a rear perspective view of the docking station according to a first embodiment of the present invention with a dust collection box mounted within the socket of the docking station.
Figure 10:
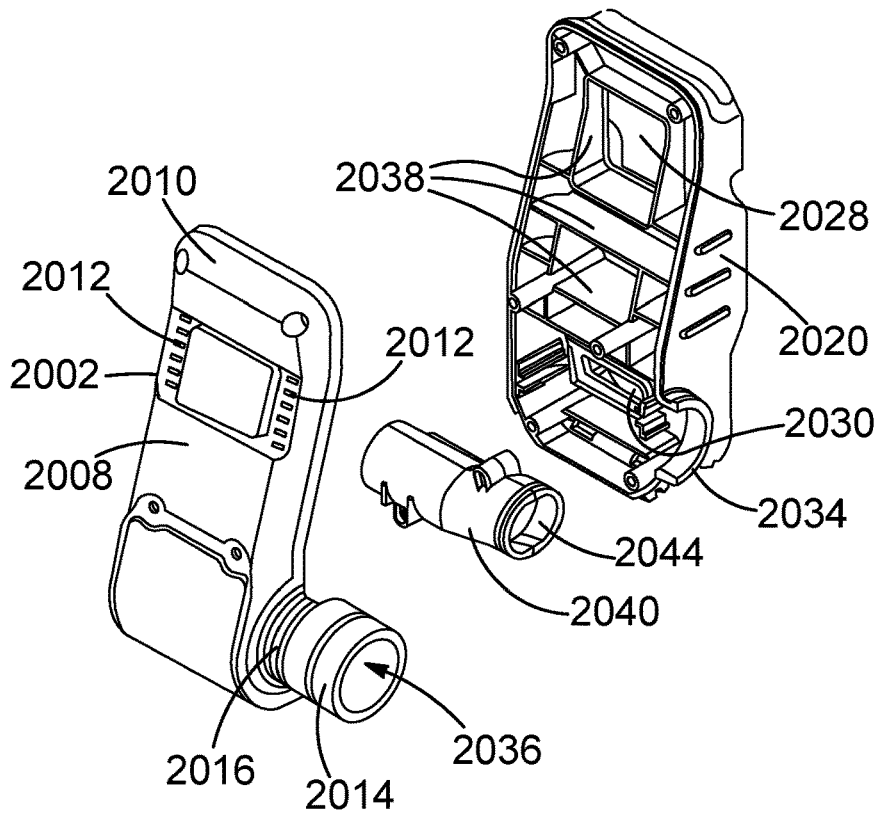
FIG. 10 shows an exploded view of the housing and dust channel of the docking station of FIG. 8.
Figure 11A:
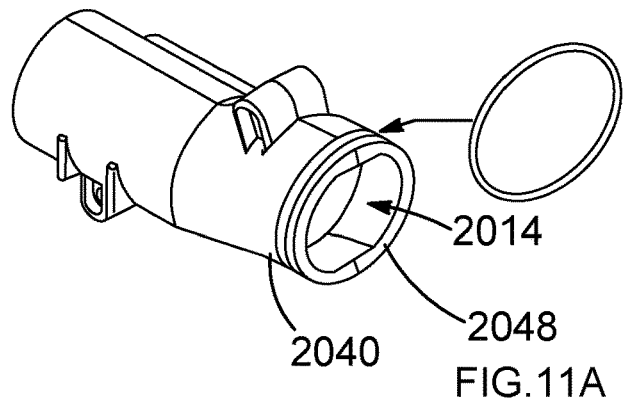
FIG. 11A shows a perspective view of the dust channel from a first side.
Figure 11B:
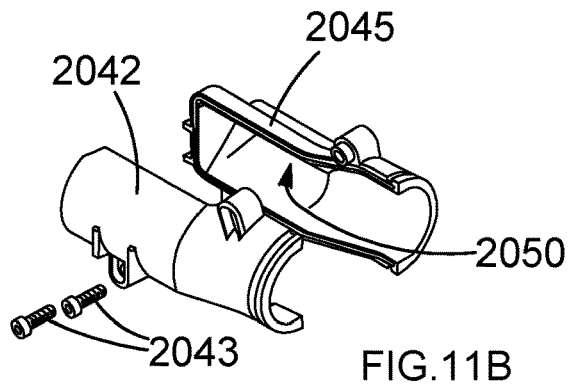
FIG. 11B shows an exploded view of the dust channel.
Figure 12:
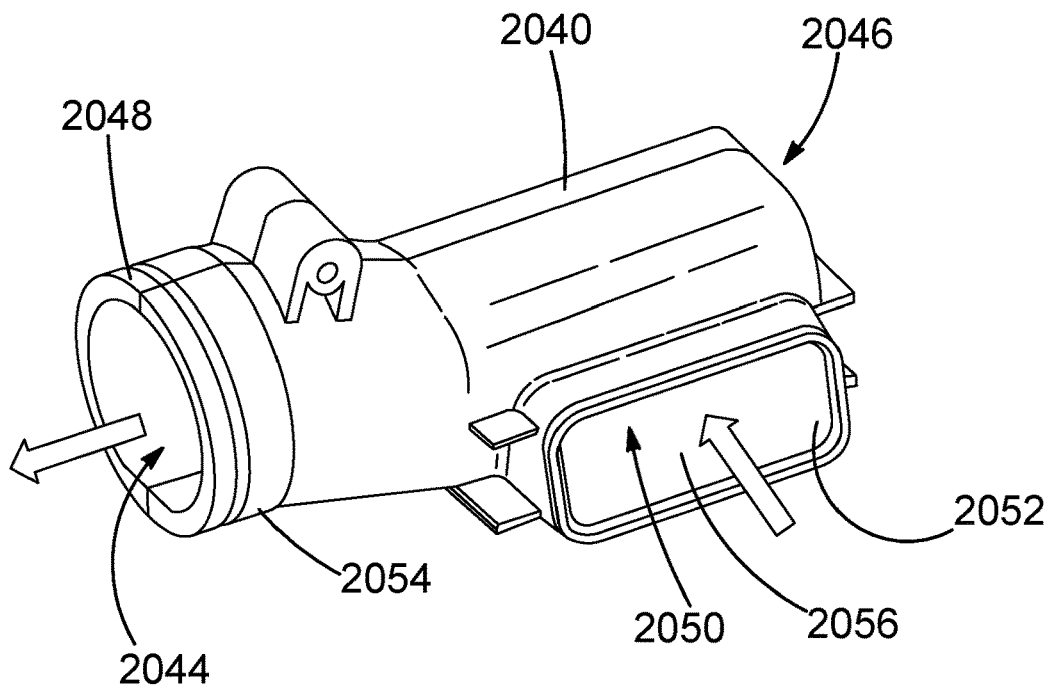
FIG. 12 shows a perspective view of the dust channel from a second side.
Figure 13:
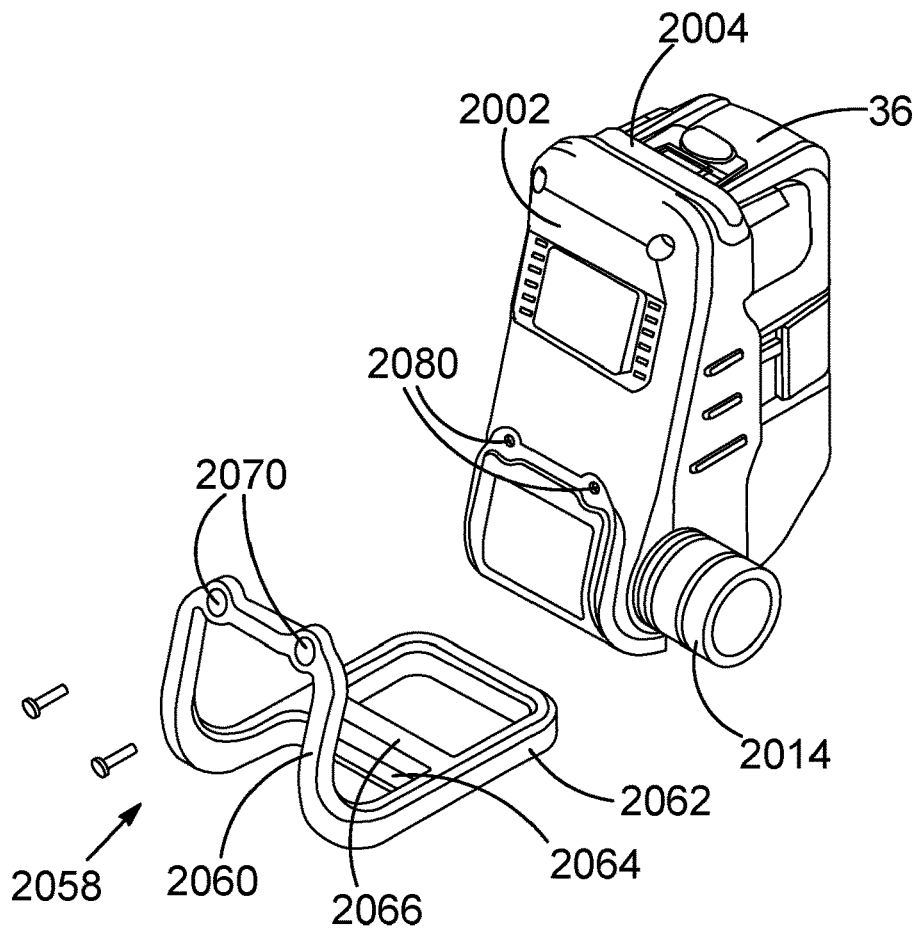
FIG. 13 shows 8 shows a rear perspective view of the docking station with a dust collection box mounted within the socket of the docking station and with the support frame shown separate from the housing.
Figure 14:
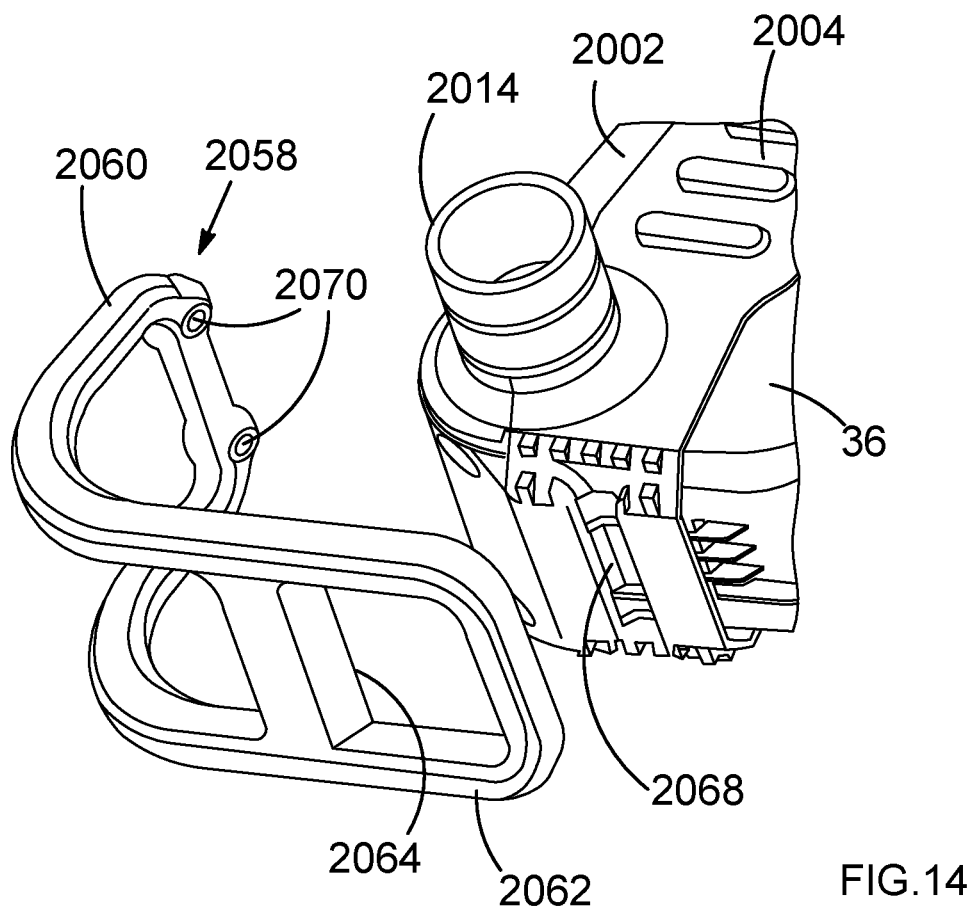
FIG. 14 shows a rear perspective view of the underside of the docking station with a dust collection box mounted within the socket of the docking station and with the support frame shown separate from the housing.
Figure 15:
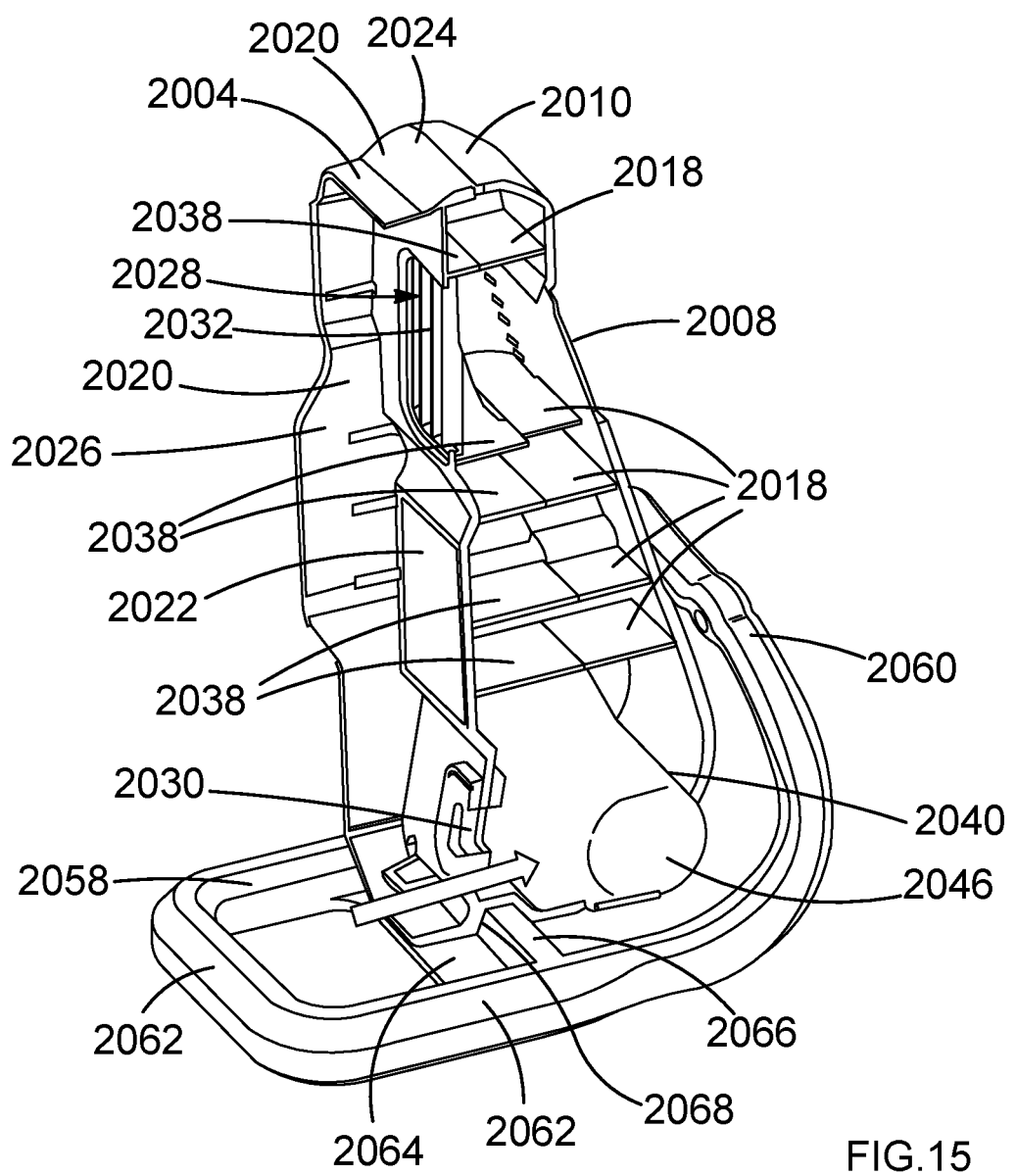
FIG. 15 shows a sectional view of the docking station.
Figure 16:
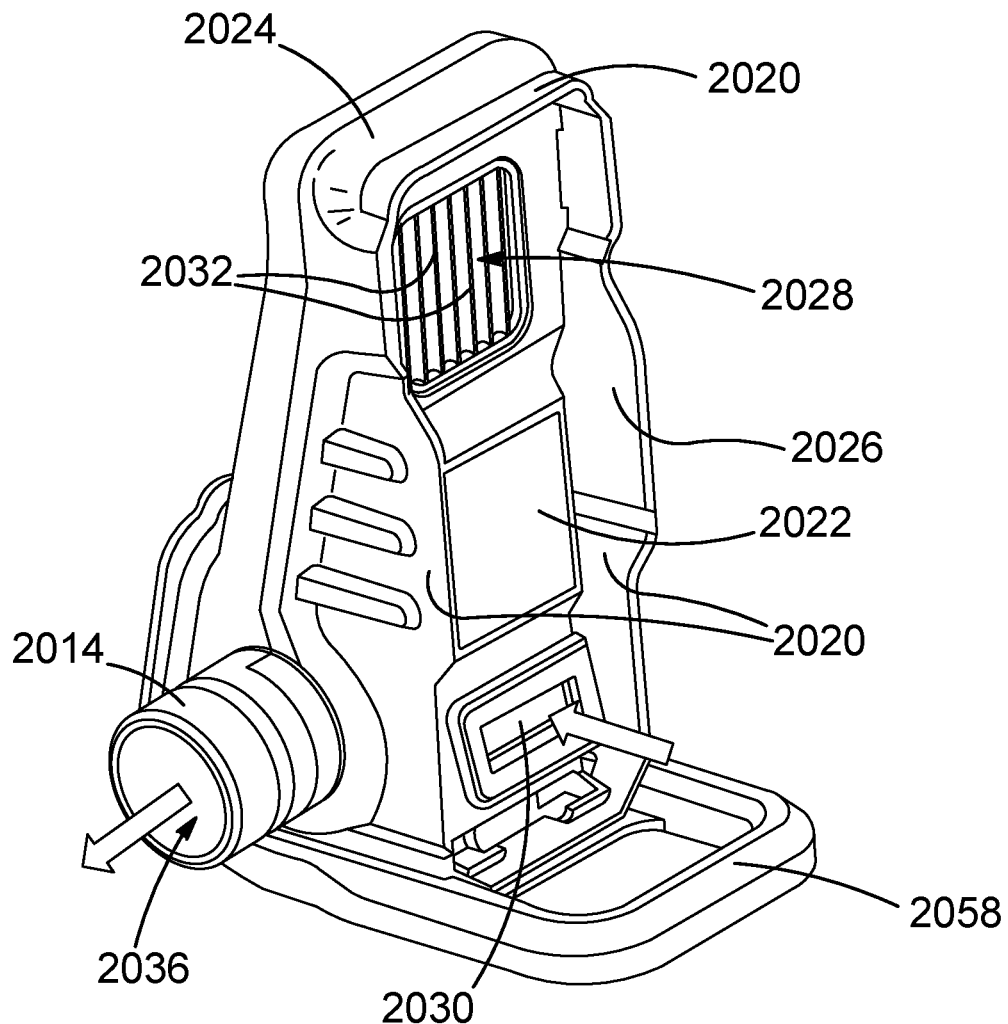
FIG. 16 shows a rear perspective view of the docking station.
Figure 17:
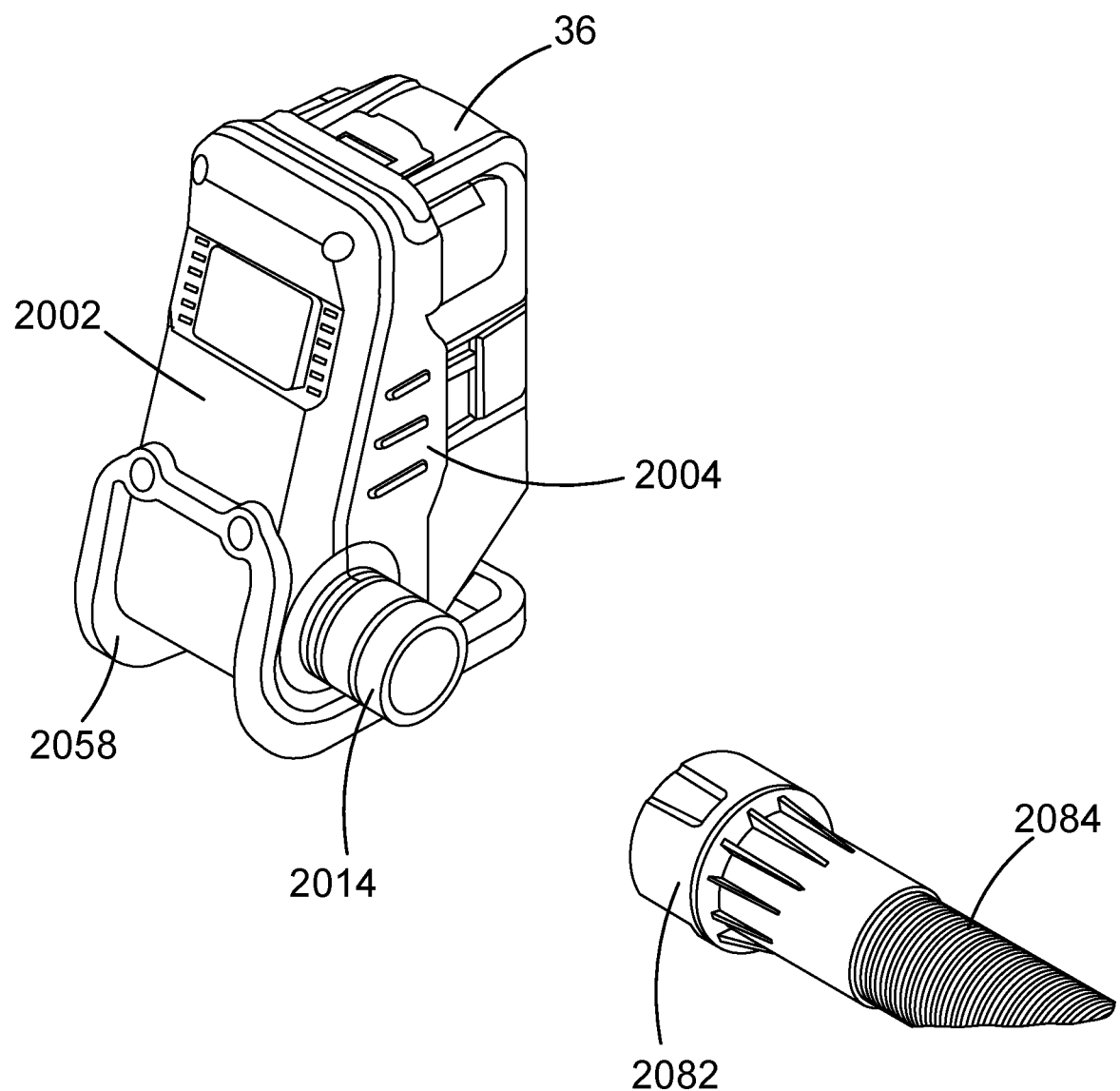
FIG. 17 shows a rear perspective view of the docking station with a dust collection box mounted within the socket of the docking station and a connector and hose of a vacuum cleaner.
Figure 20:
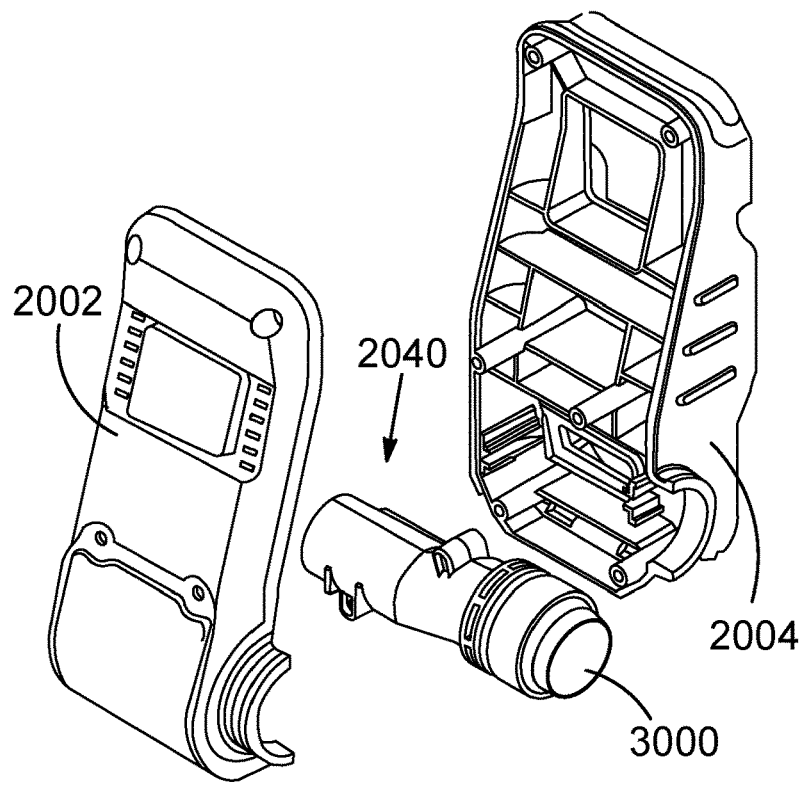
FIG. 20 shows an exploded view of the housing and dust channel of the docking station of FIG. 18.
Figure 21:
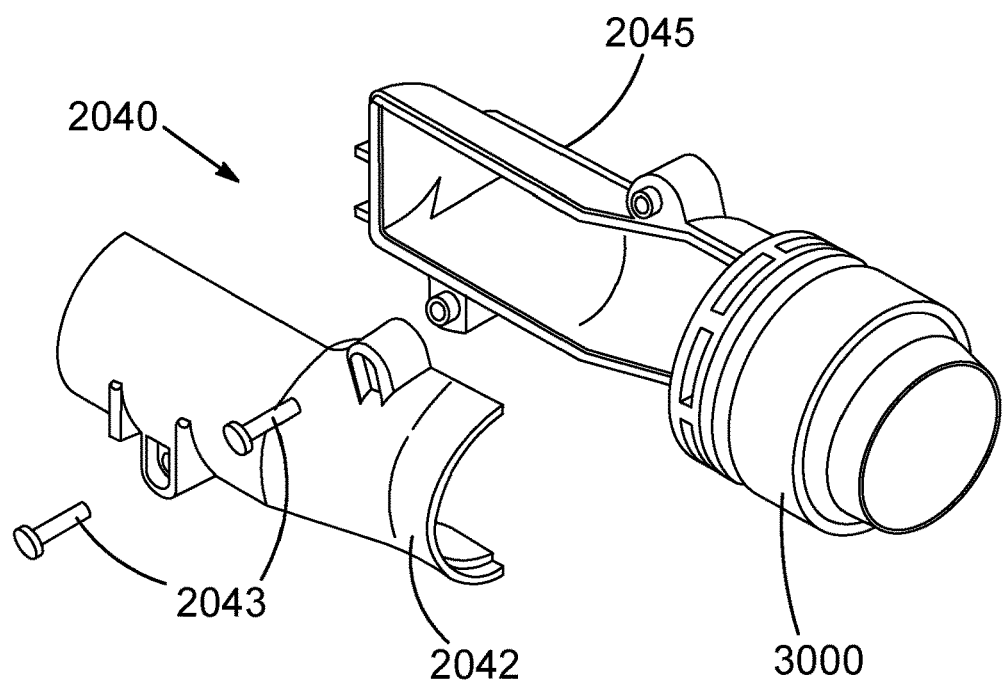
FIG. 21 shows an exploded view of the dust channel of FIG. 18.
Figure 22:
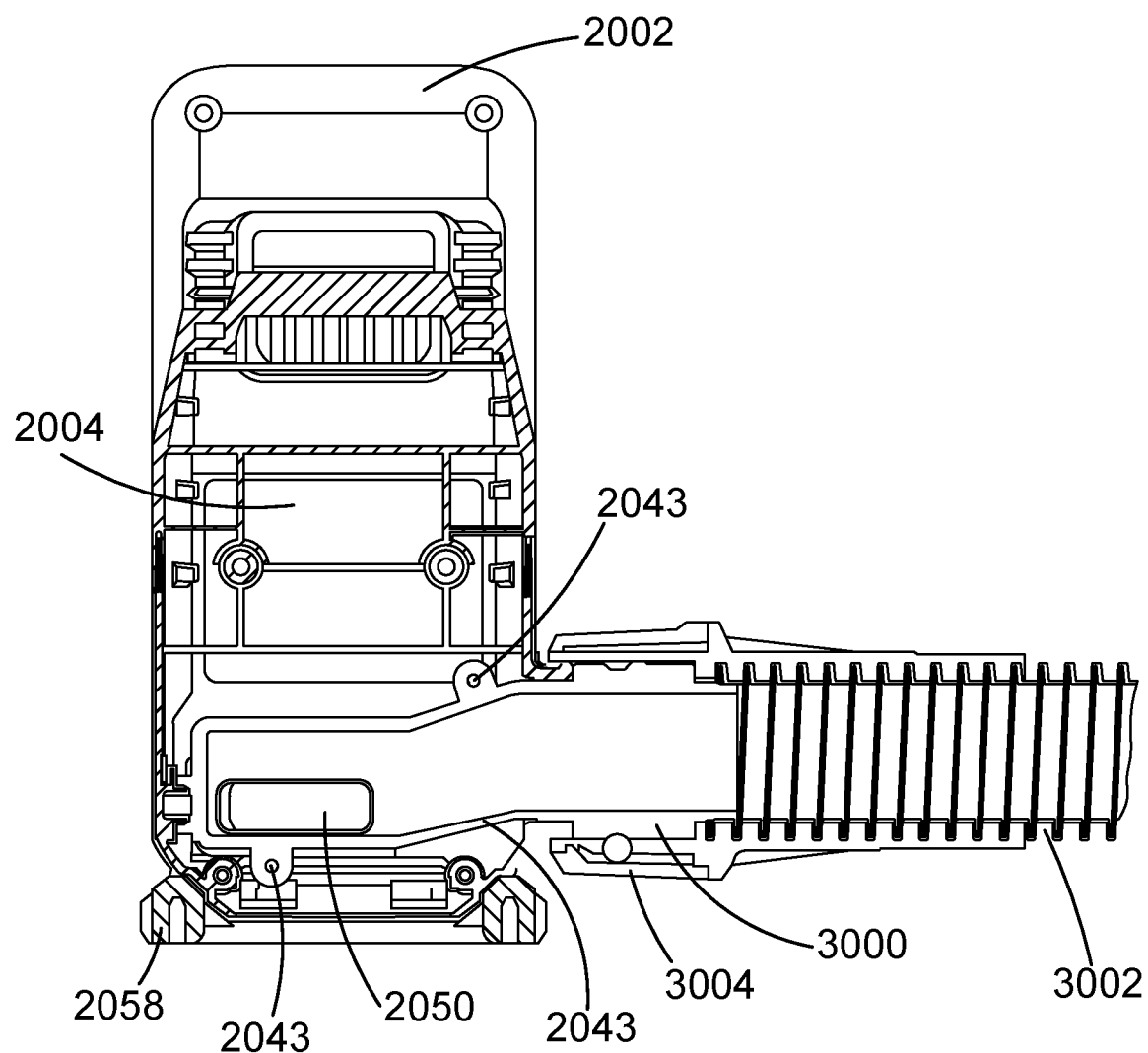
FIG. 22 shows a vertical cross section view of the docking station of FIG. 18 with a hose of a vacuum cleaner attached to the dust channel.

During normal operation, the slider 1060 is in its first forward position due to the biasing force of the spring 1066 and the rotatable air guide 1000 is in its first position with air being able to flow freely between the air outlet chamber 1044 and the air intermediate chamber 1046 whilst air is prevented from passing through the ambient air aperture 1034 (see FIGS. 6A to 6C). The motor 1084 is activated, resulting in the rotation of the fan 1088. The rotating fan 1088 moves air in the direction of Arrows Z, drawing air through both the air outlet aperture 1032 of the dust collection box 36 and the air entry aperture 1090 of the main housing 22. This reduces the air pressure in both the air outlet chamber 1044 and the air intermediate chamber 1046 as the two chambers are connected to each other via the valve 1048 which allows free movement of air between the two chambers. As such air is drawn through both parts 1080, 1210 of the filter 102 in the direction of Arrows N. This reduces the air pressure in the air inlet chamber 1202 which results in air being drawn from the air reception chamber 1094 of the main housing 22 through both the air inlet aperture 1030 of the dust collection box and the air exit aperture 1096 of the main housing 22 (Arrow Q). Air is subsequently drawn into the air reception chamber 1094 from the telescopic tube 28, 30 in well-known manner. As air passes through both parts 1080, 1210 of the filter 102, any debris entrained in the air is caught in one of the parts 1080, 1210 of the filter as the air passes through the parts of the filter in the same direction.

During backflush, the operator slides the slider 1060 back to its second rearward position against the biasing force of the spring 1066 whilst the motor 1084 is activated. This results in the rotatable air guide 1000 being moved from its first position to its second position with air being able to flow freely between the ambient air aperture 1032 and the air intermediate chamber 1046 whilst air is prevented from passing from the air intermediate chamber 1046 through to the air outlet chamber 1044 (see FIGS. 7A to 7D). The activated motor 1084 results in the rotation of the fan 1088. The rotating fan 1088 moves air in the direction of Arrows Z, drawing air through both the air outlet aperture 1032 of the dust collection box 36 and the air entry aperture 1090 of the main housing 22. This reduces the air pressure in the air outlet chamber 1044 only. As such, air is drawn through the lower part 1210 of the filter 102 only in the direction of Arrows P. This reduces the air pressure in the air inlet chamber 1202 which results in air being drawn from the air reception chamber 1094 of the main housing 22 through both the air inlet aperture 1030 of the dust collection box 36 and the air exit aperture 1096 of the main housing 22 (Arrow R). However, as the air intermediate chamber 1046 is connected to ambient air via the valve 1048 and the gap 1224, the air pressure in the air intermediate chamber 1046 is higher than that of the air inlet chamber 1202. As such, air passes through the upper part 1080 of the filter in the opposite direction (Arrows S) to the lower part 1210 of the filter from the intermediate chamber 1046 to the air inlet chamber 1202. As air passes through the upper part 1080 of the filter from the intermediate chamber 1046 to the air inlet chamber 1202, it blows off any debris trapped on the upper part of the filter and into the air inlet chamber 1202. As such, the upper part 1080 of the filter is cleaned during backflush. Air drawn from the intermediate chamber 1046 is replaced by ambient air drawn into the air intermediate chamber 1046 via the gap 1224 and the valve 1048

During backflush, air continues to be drawn into the air reception chamber 1094 from the telescopic tube 28, 30 in well-known manner and therefore operation of the dust extractor continues. As air passes through the lower part 1210 of the filter 102, any debris entrained in the air is caught by lower part 1210 of the filter. This may include debris previously trapped on the upper part 1080 which is being cleaned during backflush. A problem with this design is that when backflush is initiated, only the upper part 1080 of the filter is cleaned. The lower part 1210 of the filter remains uncleaned and therefore can become clogged. The filter 102 can be cleaned in its entirety by pivoting the lid 1022 between its closed position to an open position where the cavity can be accessed and then manually clean the filter 102 either in situ or after removing it from the cavity. However, this exposes the operator to the debris contained inside of the dust collection box 36.

A first embodiment of the present invention will now be described with reference to FIGS. 8 to 17. Where the same features are present in the embodiment are present in the example described with reference to FIGS. 2 to 7, the same reference numbers have been used.

The present invention provides a docking station for the dust collection box 36 whereby the dust collection box 36 can be mounted on the docking station and the dust be removed from the whole of the filter whilst it remains located inside of the dust collection box 36.

Referring to FIGS. 8 to 17, the docking station comprises a housing 2000 which is made from two plastic clam shells 2002, 2004 which are attached to each other using screws 2006.

The first clam shell 2002 forms the rear of the housing 2000. The first clam shell 2002 comprises a rear wall 2008 and side walls 2010 which form a generally rectangular box to create a cavity. Air vents 2012 are formed through the rear wall 2008, providing an air passage between the cavity and the air surrounding the housing 2000. A tube 2014, of circular cross section, is integrally formed as part of the first clam shell 2002. The tube 2014 extends sideways from one of the side walls 2010 in a direction generally parallel to the plane in which the rear wall 2012 extends. The tube 2014 is connected to the side wall 2010 via a semi-circular wall 2016 which forms a wall around half of a circular aperture formed through the side of the housing 2000. Formed inside of the cavity are a series of internal walls 2018 which connect to the inner surfaces of the side walls 2010 and the rear wall 2008. The internal walls 2018 are integral with the first clam shell 2002 and provide structural support to the clam shall 2002 to make it more rigid. The internal walls 2018 are also act as guides for the movement of air within the first clam shell 2002.

The second clam shell 2004 comprises side walls 2020 and central wall 2022. The side walls 2020 are arranged so that they form a generally rectangular frame. The size and shape of the frame is such that, when the first clam shell 2002 is attached to the second clam shell 2004, the edges of the side walls 2010 of the first clam shell which face towards the first clam shell 2002, mate with the edges of the side walls 2020 of the second clam shell 2004, the external surfaces of the both sets of side walls 2010, 2020 being flush, to form a continuous single side walls of the housing 2000 of the docking station. The central wall 2022 is mounted inside of the frame, its periphery being attached to inner surface of the side walls 2020. The side walls 2020 are separated into two parts 2024, 2026 by the central wall 2022. The first part 2024 of the side walls 2020 extend away from the central wall 2022 in a first direction, the second part 2026 of the side walls 2020 extend away from the central wall 2022 in a second direction which is opposite to the first direction. The first part 2024 of the side walls mate with the side walls 2010 of the first clam shell 2002 when the first and second clam shells 2002, 2004 are attached to each other. The second part of the side walls 2026 and the central wall 2022 form a socket which is capable of receiving a dust collection box of a dust extractor. Formed through the top section of the central wall 2022 is a first central wall aperture 2028. The first central wall aperture 2028 comprises bars 2032 which extend across the aperture 2028. Formed through the bottom section of the central wall 2022 is a second central wall aperture 2030. The two apertures allow air to pass through the central wall 2022.

A semi-circular wall 2034 is integrally formed with a side wall 2020 of the second clam shell 2004. The semi-circular wall 2034 forms a wall around half of a circular aperture formed through the side of the housing 2000. When the first and second clam shells 2002, 2004 are attached to each other, the semi-circular wall 2016 of the first clam shell 2002 and the semi-circular wall 2034 of the second clam shell 2004 mate with each other to form a complete circular wall which is aligned with and forms an extension to the tube 2014 to form a tubular passage 2036 through the tube 2016 and the circular wall 2016, 2034 and into the housing 2000.

Formed in side of the cavity formed by the first part 2024 of the side walls 2020 and the central wall 2022 are a series of internal walls 2038 which connect to the inner surfaces of the side walls 2020 and central wall 2022. The internal walls 2038 are integral with the second clam shell 2004 and provide structural support to the clam shall 2004 to make it more rigid. The internal walls 2038 also act as guides for the movement of air within the second clam shell 2004. When the first and second clam shells 2002, 2004 are attached to each other, the internal walls 2018 of the first clam shell align with the internal walls 2038 of the second clam shell 2004 in order to assist in the guiding of the air within the housing 2000.

If the docking station is to be used with the dust collection box 36 described in the example above as described with reference to FIGS. 2 to 7, then the design of the socket can match the design of the socket formed within the dust extractor described in the example above. However, it will be appreciated that whilst the socket can be designed to receive a specific design of dust extractor, the socket could have a design which is capable of receiving a range of designs of dust collection boxes.

Mounted in side of the housing 2000 of the docking station is a tubular dust channel 2040. The dust channel 2040 is constructed from two plastic clam shells 2042 2045 which are attached to each other using screws 2043. The dust channel 2040 forms a passageway 2044 which is circular in cross section. One end of the tubular dust channel 2040 comprises a wall 2046 which seals off one end the tubular passageway 2044. The other second end 2048 of the tubular dust channel 2040 is open to form an entrance to the passageway 2044. A rectangular aperture 2050 is formed through the side of the dust channel 2040 which is surrounded by a rectangular wall 2052. The outer circumference of the second end 2048 is the same as that of the inner diameter of the complete circular wall formed by the semi-circular wall 2016 of the first clam shell 2002 and the semi-circular wall 2034 of the second clam shell 2004 when the two clam shells 2002, 2004 are connected to each other. When the docking station is assembled, the second end 2048 of the dust collection channel is placed between the semi-circular wall 2016 of the first clam shell 2002 and the semi-circular wall 2034 of the second clam shell 2004, which then sandwich the second end 2048 and grip it securely as the two clams shells 2002, 2004 are fastened together using screws 2006. The dust collection channel 2040 is held in place by the semi-circular wall 2016 of the first clam shell 2002 and the semi-circular wall 2034 of the second clam shell 2004 squeezing the second end 2048 frictionally gripping it and holding it in position. A seal 2054 surrounds the second end 2048 and is sandwiched between the second end 2048 and the circular wall 2016, 2034. The seal 2054 prevents air passing between the second end 2048 and the circular wall 2016, 2034.

When the tubular dust channel 2040 is mounted inside of the assembled housing 2000, the entry to a passage 2056 formed by the rectangular wall 2052 aligns with and abuts up against the second central wall aperture 2030 of the central wall 2022. The entry of the passage 2056 formed by the rectangular wall 2052 is the same shape as that of the second central wall aperture 2030 so that a seal is formed between the two. The passageway 2044 of the dust collection channel 2040 connects the passageway in the tube 2014 with the second central wall aperture 2030 allowing air to pass freely between the two inside of the housing 2000 whilst preventing any air within the passageway 2044 from entering any other internal space or cavity within the housing 2000.

It will be appreciated that the dust collection channel 2040 could be made integrally, in part or in full, with one or both of the first and second clam shells 2002, 2004.

When the two clam shells 2002, 2004 are attached together, air is able to freely pass from the surrounding atmosphere through the vents 2012, through a cavity crated by the connected clam shells 2002, 2004 to the first central wall aperture 2028 formed through the central wall 2022. The movement of the air is guided by the internal walls 2018, 2038 of the two clam shells 2002, 2004. However, the air passing the through the internal space cannot interact with the air passing through the passageway 2044 of the dust channel 2040.

The assembled housing 2000 is mounted on a support frame 2058. The frame 2058 is made from a rectangular metal bar which is angled towards one end to form a raised portion 2060 and a horizontal portion 2062. A cross bar 2064 is attached to the rectangular bar 2058 at both of its ends and traverses it in a width wise direction between the sides of the rectangular bar 2058 across the horizontal portion 2062. A rib 2066 is formed along the top of the cross bar 2064 which engages with a slot 2068 formed in the underside of the second clam shell 2004 when the frame is attached to the housing 2000. Two screws pass through holes 2070 formed through the end of the rectangular bar in the raised portion 2060 which engage with apertures 2080 formed in the rear wall 2008 on the first clam shell 2002 when the housing 2000 sits on the frame 2058 to secure the frame 2058 to the housing 2000.

The frame 2058 is attached to housing 2000 and placed on a work surface, the horizontal portion 2062 lies against the work surface to support the docking station. The raised portion 2060 extends from the horizontal portion 2062 part way up the front of the housing 2000. The horizontal portion of the frame extends under the full width of the housing and past the rear of the housing so that, when a dust collection box is mounted on the docking station, the horizontal portion extends beneath the dust collection box 36.

The tube 2014 is used as a nozzle which is connected to a vacuum source such as an industrial vacuum cleaner via a connector 2082 and hose 2084. The tube 2014 could be in the form of connector of a standard design capable attaching to a corresponding connector 2082 of a vacuum cleaner therefore will not be described in any further detail.

When the docking station is used, a vacuum cleaner is connected to the nozzle 2014 via the connector 2082 and hose 2084. A dust collection box 36 is inserted into the socket of the docking station. When the dust collection box 36 is mounted within the socket, the air outlet aperture 1032 of the dust collection box 36 aligns with the first central wall aperture 2028 formed in the central wall 2022. When the dust collection box 36 is mounted within the socket, the air inlet aperture 1030 of the dust collection box 36 aligns with the second central wall aperture 2030 formed in the central wall 2022.

The vacuum cleaner is then activated. Air is sucked through the hose 2084 and connector 2082. This turn sucks air through the tube 2014, through the passageway 2042 of the dust channel 2040 and through the second central wall aperture 2030. This result is air being drawn out of the dust collection box through the air inlet aperture 1030 of the dust collection box 36. As air is drawn out of the dust collection box 36, the air inside of the dust collection box 36 is replenished by air entering the dust collection box 36 through the air outlet aperture 1032 of the dust collection box 36. This causes air to be sucked through the vents 2012 into the housing 2000, through the inside cavity of the housing 2000 to the first central wall aperture 2028, and through the first central wall aperture 2028 formed in the central wall 2022. As such is drawn through the dust collection box 36 in the reverse direction to that when dust collection box 36 is used to collect dust when mounted on a dust extractor. As such, the air passes through the filter 102 in the reverse direction. As the air passes through the filter 102 in the reverse direction, and dust trapped within the filter is removed by the flow of air, and passes into the housing 200 through the dust channel 2040 and then onto the vacuum cleaner where it is collected. Once the filter is clean, the vacuum cleaner can be switched off and the dust collection box 36 removed from the socket for use on a dust extractor. As such, the whole of the filter 102, is able to be cleaned whilst remaining in the dust collection box 36.

It will be appreciated that the docking station would still work if, when a dust collection box 36 is inserted into the socket of the docking station, the air outlet aperture 1032 of the dust collection box 36 is connected directly to ambient air surrounding the docking station instead of the first central wall aperture 2028 formed in the central wall 2022.

A second embodiment of the present invention will now be described with reference to FIGS. 18 to 22. Where the same features are present in the second embodiment are present in the first embodiment, described with reference to FIGS. 8 to 17, the same reference numbers have been used.

The second embodiment is the same as the first embodiment except for the design of the dust channel 2040. In the second embodiment, the tube 2014, which acts as a connector in the first embodiment, has been removed from the first clam shell 2002. A connector 3000, for connection with an adapter 3004 of a hose 3002 of a vacuum cleaner, is now integrally formed with the dust channel 2040. In particular, the connector 3000 is integrally formed with one of the plastic clam shells 2045 of the dust channel 2040. The connector 3000 is of a standard design of connector 3000 capable attaching to an adaptor 3004 of a vacuum cleaner therefore will not be described in any further detail. The two clam shells 2042, 2045 of the dust channel are manufactured from an "anti-static material", preferably, an "anti-static" plastic in order to reduce or eliminate static electricity. Ideally, any adapter 3004 and hose 3002 of a vacuum cleaner are also made from anti-static material to enable static electricity to flow away from the docking station. The dust channel 2014 is otherwise constructed in the same manner as the dust channel 2014 in the first embodiment and is mounted inside of the first and second clam shells 2002, 2004 and used in the same manner as in the first embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A docking station for a dust collection box comprising:
   a housing;
   a socket formed by the housing configured to receive a dust collection box of a dust extractor;
   a first aperture formed through a wall of the housing which aligns with an air outlet aperture of a dust collection box when the dust collection box is mounted within the socket;
   a second aperture formed through a wall of the housing which aligns with an air inlet aperture of a dust collection box when the dust collection box is mounted within the socket;
   a connector connectable to a vacuum source; and
   a dust channel, formed inside of the housing, which provides a passageway between the second aperture and the connector.

2. A docking station for a dust collection box according to claim 1, further comprising:
   at least one air vent formed through a wall of the housing to allow air surrounding the housing to enter a cavity formed inside of the housing,
   wherein the first aperture is connected to the cavity in the housing to allow air in the cavity to exit the housing through the first aperture.

3. A docking station according to claim 1, wherein the first aperture is located in a wall which forms part of the socket.

4. A docking station according to claim 1, wherein the second aperture is located in a wall which forms part of the socket.

5. A docking station according to claim 1, wherein the first and second apertures are located in the same wall.

6. A docking station according to claim 2, wherein air passing through the cavity is prevented from interacting with air passing through the dust channel.

7. A docking station according to claim 1, wherein the connector is a tube which extends away from the housing.

8. A docking station according to claim 1, wherein the connector is integrally formed with the dust channel.

9. A docking station according to claim 1, wherein the dust channel comprises two plastic clam shells which are fastened to each other.

10. A docking station according to claim 1, wherein the connector is a standard design of connector capable of engaging an adapter of a vacuum cleaner.

11. A docking station according to claim 1, wherein at least one of the dust channel and/or connector are made from an anti-static material.

12. A docking station according to claim 1, wherein the housing comprises two clam shells which are fastened to each other.

13. A docking station according to claim 12, wherein the dust channel is mounted within the housing by a part of the dust channel being sandwiched between and held by parts of each of the two clam shells when the two clam shells are fastened to each other.

14. A docking station according to claims 13 wherein a seal surrounds the dust channel which is sandwiched between the dust channel and the parts of the two clam shells which are holding the dust channel to prevent air from passing between the dust channel and the parts of the two clam shells which are holding the dust channel.

15. A docking station according to claim 2, further comprising internal walls within the housing which act as air guides to direct the movement of the air inside of the cavity.

16. A docking station according to claim 1, wherein the housing is mounted on a frame.

17. A docking station according to claim 16, wherein the frame comprises:
- a rectangular metal bar which is angled towards one end to form a raised portion and a horizontal portion;
- a cross bar is attached to the rectangular bar at both of its ends and which traverses it in a width wise direction between the sides of the rectangular bar across the horizontal portion; and
- a rib formed along the top of the cross bar which engages with a slot formed in the underside of the housing when the frame is attached to the housing;
- wherein the frame is attached to the housing by locating the rib within the slot and attaching the raised portion to the housing.

18. A docking station according to claims 17, wherein the raised portion extends from the horizontal portion part way up the front of the housing.

19. A docking station according to claim 17, wherein the horizontal portion of the frame extends under the full width of the housing and past the rear of the housing so that, when a dust collection box is mounted on the docking station, the horizontal portion extends beneath the dust collection box.

20. A docking station according to claim 17, wherein, when docking station is placed on a work surface, the horizontal portion lies against the work surface to support the docking station.

21. A docking station according to claim 1, wherein the dust channel comprises a tube which is mounted within the housing.

22. A dust collection box cleaning system comprising a docking station according to claim 1 and a dust collection box, wherein the dust collection box comprises:
- a housing;
- a filter mounted within the housing;
- a first air inlet chamber formed within the housing;
- an air inlet aperture in a wall of the housing which connects to the first air inlet chamber through which air is capable of being drawn into the first air inlet chamber when used on a dust extractor; and
- an air outlet aperture formed in the wall of the housing which connects to the filter through which air is capable of being drawn through the filter by a vacuum source when mounted on a dust extractor;
- wherein the first inlet chamber is connected to the filter;
- wherein, when the dust collection box is mounted on the docking station, air is capable of being drawn out of the first air inlet chamber through the air inlet aperture in the wall of the housing of the dust collection box and into the second aperture formed through a wall of the housing of the docking station.

23. A dust collection box cleaning system according to claim 22, wherein there is further provided a first aperture formed through a wall of the housing of the docking station which aligns with an air outlet aperture of a dust collection box when the dust collection box is mounted within the socket;
- wherein at least one air vent is formed through a wall of the housing to allow air surrounding the housing to enter a cavity formed inside of the housing;
- wherein the first aperture is connected to the cavity in the housing to allow air in the cavity to exit the housing through the first aperture;
- wherein the first aperture is connected to the cavity in the housing to allow air in the cavity to exit the housing through the first aperture; and
- wherein, when the dust collection box is mounted on the docking station, air is capable of being blown through the filter via the air outlet aperture formed in the wall of the housing of the dust collection box from the first aperture formed through the wall of the housing of the docking station.

24. A dust collection box cleaning system as claimed in claim 22, wherein there is further provided a second air outlet chamber formed within the housing of the dust collection box;
- wherein the air outlet aperture formed in the wall of the housing connects to the air outlet chamber through which air is capable of being drawn out of the air outlet chamber by a vacuum source when mounted on a dust extractor;
- wherein the first inlet chamber is connected to the second air outlet chamber via the filter;
- wherein there is further provided a first aperture formed through a wall of the housing of the docking station which aligns with the air outlet aperture of a dust collection box when the dust collection box is mounted within the socket;
- wherein at least one air vent is formed through a wall of the housing to allow air surrounding the housing to enter a cavity formed inside of the housing;
- wherein the first aperture is connected to the cavity in the housing to allow air in the cavity to exit the housing through the first aperture;
- wherein, when the dust collection box is mounted on the docking station, air is capable of being blown into the air outlet chamber through the air outlet aperture formed in the wall of the housing of the dust collection box from the first aperture formed through the wall of the housing of the docking station.

\* \* \* \* \*